(12) United States Patent
Ueyama

(10) Patent No.: US 8,998,442 B2
(45) Date of Patent: Apr. 7, 2015

(54) LIGHTING DEVICE, DISPLAY DEVICE AND TELEVISION RECEIVER

(75) Inventor: Munetoshi Ueyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 519 days.

(21) Appl. No.: 13/509,005

(22) PCT Filed: Nov. 2, 2010

(86) PCT No.: PCT/JP2010/069459
§ 371 (c)(1),
(2), (4) Date: May 10, 2012

(87) PCT Pub. No.: WO2011/058903
PCT Pub. Date: May 19, 2011

(65) Prior Publication Data
US 2012/0293724 A1    Nov. 22, 2012

(30) Foreign Application Priority Data

Nov. 12, 2009    (JP) .................................. 2009-259175

(51) Int. Cl.
*F21S 4/00* (2006.01)
*F21V 8/00* (2006.01)
*G09G 3/34* (2006.01)

(52) U.S. Cl.
CPC ............ *G02B 6/0083* (2013.01); *G02B 6/0046* (2013.01); *G02B 6/0068* (2013.01); *G02B 6/0073* (2013.01); *G02B 6/0078* (2013.01); *G09G 3/34* (2013.01); *G09G 2300/0426* (2013.01)

(58) Field of Classification Search
CPC ... G09G 1/00; G09G 2230/00; G02B 6/0068; G02B 6/0073; G02B 6/0083
USPC ................... 362/611, 612, 613, 97.1, 97.2
See application file for complete search history.

(56) References Cited

U.S. PATENT DOCUMENTS

| | | | |
|---|---|---|---|
| 6,491,412 B1 * | 12/2002 | Bowman et al. | ............. 362/241 |
| 2005/0141244 A1 | 6/2005 | Hamada et al. | |
| 2008/0074902 A1 | 3/2008 | Oh et al. | |

(Continued)

FOREIGN PATENT DOCUMENTS

| EP | 1 453 111 A2 | 9/2004 |
|---|---|---|
| JP | 2007-165064 A | 6/2007 |
| JP | 2008-186914 A | 8/2008 |

OTHER PUBLICATIONS

Official Communication issued in International Patent Application No. PCT/JP2010/069459, mailed on Jan. 18, 2011.

*Primary Examiner* — Ali Alavi
(74) *Attorney, Agent, or Firm* — Keating & Bennett, LLP

(57) ABSTRACT

A lighting device having a simplified connection configuration between light sources and a light source driver is provided. A backlight unit 12 according to this invention includes a plurality of LED boards 18 on which LEDs 17 are mounted. The LEDs 17 are light sources. Each LED board 18 includes a connection wiring pattern 27 electrically connected to the LEDs 17 and a through wiring pattern 28 not electrically connected to the LEDs 17. The connection wiring pattern 27 is connected to the through wiring pattern 28 on the other LED board 18. The connection wiring pattern 27 of each LED board 18 electrically connected to the LEDs 17 is electrically connected to the through wiring pattern 28 of the other LED board 18 not electrically connected to the LEDs 17.

14 Claims, 12 Drawing Sheets

(56) References Cited

U.S. PATENT DOCUMENTS

| | | |
|---|---|---|
| 2008/0239750 A1* | 10/2008 | Chang .......................... 362/609 |
| 2008/0297695 A1* | 12/2008 | Sekiguchi et al. ............. 349/65 |
| 2009/0097246 A1* | 4/2009 | Tsao et al. ................... 362/240 |
| 2010/0073582 A1* | 3/2010 | Konno et al. ................. 348/794 |
| 2012/0243255 A1* | 9/2012 | Yamamoto ................... 362/602 |
| 2014/0071713 A1* | 3/2014 | Liao .............................. 362/627 |
| 2014/0146531 A1* | 5/2014 | Ng et al. ....................... 362/231 |

* cited by examiner

FIG.1
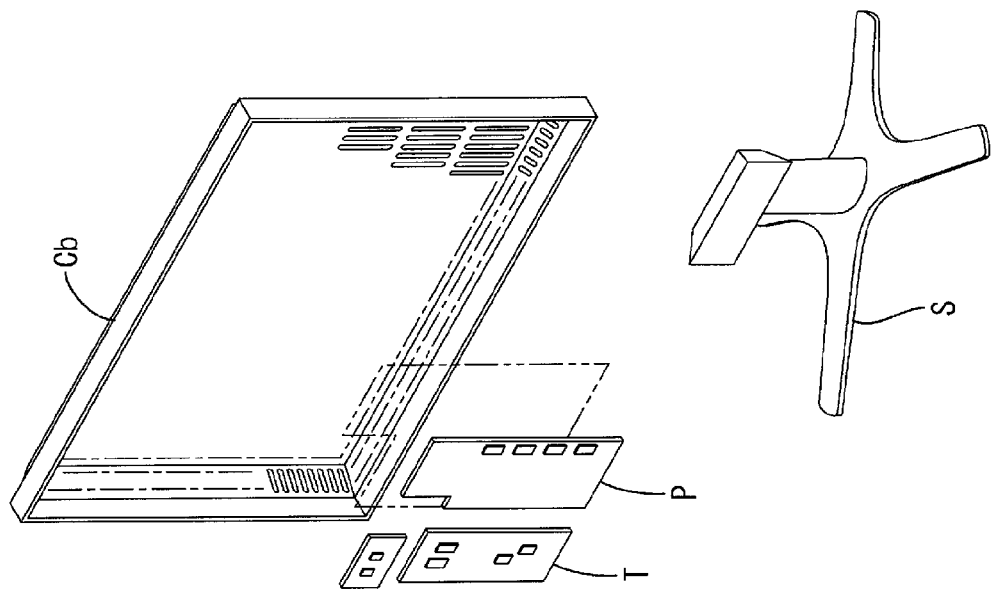
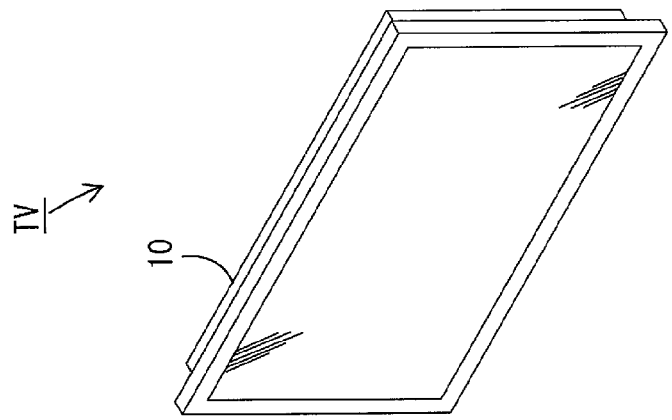
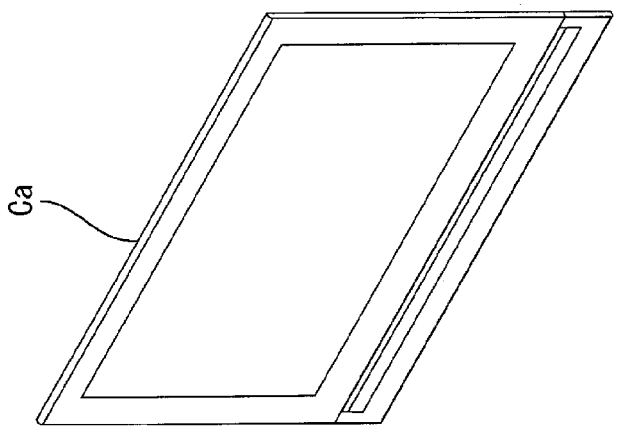

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal panel included in a liquid crystal display device such as a liquid crystal television does not emit light, and thus a backlight device that is an external light source for supplying light to the liquid crystal panel is required. A backlight device including LEDs as light sources for reducing power consumption or increasing intensity is more focused. An example of such a backlight device including LEDs as light sources is disclosed in Patent Document 1.

RELATED ART DOCUMENT

Patent Document

Patent Document 1: Japanese Unexamined Patent Application Publication No. 2007-165064

Problem to be Solved by the Invention

Such a backlight device includes an LED board on which a plurality of LEDs are mounted. Wiring patterns for electrical connection of the LEDS are provided on the LED board and an FPC connected to a driver circuit board is connected to terminals at ends of the wiring patterns.

In recent years, screen sizes of liquid crystal display devices are increasing, and the number of LEDS used in a backlight device tends to significantly increase. When driving a plurality of LEDs in series, a driving voltage tends to increase as the number of the LEDs connected in series increases. Because the driving voltage has limitation, the actual number of LEDs that can be driven in series is limited. To drive a number of LEDs for a large screen display device, the following method may be considered. The LEDs are divided into a plurality of groups, and the LEDs are driven in series by groups.

To use such a method, wirings are required for the respective groups of LEDs for connecting them to the driver circuit board. Namely, the number of wirings increases and configurations of the wirings may be complicated. As a result, assembly work in production may be complicated.

DISCLOSURE OF THE PRESENT INVENTION

The present invention was made in view of the foregoing circumstances. An object of the present invention is to simplify a connection configuration between a light source and a light source driver.

Means for Solving the Problem

To solve the above problem, a lighting device of the present invention includes a plurality of light source boards having light sources mounted thereon. Each light source board includes a connection wiring pattern and a through wiring pattern. The connection wiring pattern is electrically connected to the light source and the through wiring pattern of the other light source board. The through wiring pattern is not electrically connected to the light source.

The connection wiring pattern of each light source board electrically connected to the mounted light sources is electrically connected to the through wiring pattern of the other light source board not electrically connected to the light sources. Therefore, the light sources mounted on the specific light source board is electrically connected to an external light source driver via the connection wiring pattern and the through wiring pattern of the other light source board and driven. Namely, the light sources are connected to the external light source driver using the through wiring patterns of the other boards. In comparison to configurations having wiring patterns for connecting light source boards to an external light source driver in addition to those of the light source boards, the connection configurations can be simplified and thus the workability improves.

The following configuration may be preferable as embodiments of the present invention.

(1) Each light source board may include a first terminal portion at one end and a second terminal portion at another end. The first terminal portion may include a first connection terminal and a first through terminal arranged adjacent to each other. The first terminal portion may be provided at an end of the connection wiring pattern. The first through terminal may be provided at an end of the through wiring pattern. The second terminal portion may include a second connection terminal and a second through terminal arranged adjacent to each other. The second connection terminal may be provided at another end of the connection wiring pattern. The second through terminal may be provided at another end of the through wiring pattern. The connection wiring pattern and the through wiring pattern may have an intersection such that an arrangement of the first connection terminal and the first through terminal in the first terminal portion may be different from an arrangement of the second connection terminal and the second through terminal in the second terminal portion.

To electrically connect the specific light source board to the other light source board, the first terminal portion of the other light source board is connected to the second terminal portion of the specific light source board. Because the connection wiring pattern and the through wiring pattern have the intersection, the arrangement of the second connection terminal and the second through terminal in the second terminal portion of the specific light source board is different from the arrangement of the first connection terminal and the first through terminal in the first terminal portion of the other light source board. Therefore, when the first terminal portion is connected to the second terminal portion, the first through terminal is connected to the second connection terminal and the first connection terminal is connected to the second through terminal. As a result, the connection wiring pattern of the specific light source board is connected to the through wiring pattern of the other light source board and the through wiring pattern of the specific light source board is connected to the connection wiring pattern of the other light source board. Even through the wiring configurations of the light source boards are the same, the connection wiring patterns and the through wiring patterns of the light source board can be connected to each other. Therefore, the manufacturing cost of the light source boards can be reduced.

(2) The light source boards may include at least a first light source board, a second light source board, and a third light source board, each including at least two through wiring patterns. The connection wiring pattern of the first light source board may be connected to any one of the through wiring patterns of the second light source board and any one of the through wiring patterns of the third light source board. The at least two through wiring patterns of the first light source board may be connected to the connection wiring pattern of the second light source board and the through wiring patterns of the second light source board other than the through wiring pattern connected to the connection wiring pattern of the first light source board, respectively, and to the connection wiring pattern of the third light source board and the through wiring patterns of the third light source board other than the through wiring pattern connected to the connection wiring pattern of the first light source board, respectively. With this configuration, three or more light source boards can be properly connected.

(3) Each light source board may include a connector having the first terminal portion and a connector joint having the second terminal portion and plugged into the connector of the other light source board. In comparison to configurations including relay components for relay-connecting the terminal portions separately from the light source boards, the number of parts can be reduced and thus the cost can be reduced.

(4) A first relay component and a second relay component may be provided. The first relay component may relay-connect the second terminal portion of the first light source board to the first terminal portion of the second light source board. The second relay component may relay-connect the second terminal portion of the second light source board to the second terminal portion of the third light source board. The first relay component may include a plurality of parallel relay wiring patterns parallel to each other and connected to the second terminal portion of the first light source board and the first terminal portion of the second light source board. The second relay component may include a plurality of crossing relay wiring patterns crossing each other and connected to the second terminal portion of the second light source board and the second terminal portion of the third light source board.

The second terminal portion of the first light source board and the first terminal portion of the second light source board are relay-connected to each other via the first relay component. The arrangement of the second connection terminal and the second through terminal in the second terminal portion is different from the arrangement of the first connection terminal and the first through terminal in the first terminal portion. The first relay component includes parallel relay wiring patterns. Therefore, the second connection terminal of the connection wiring pattern of the first light source board can be connected to one of the first through terminals of the through wiring patterns of the second light source board. Furthermore, the second through terminals of the through wiring patterns of the first light source board can be connected to the first connection terminal of the connection wiring pattern of the second light source board and the first through terminal of the through wiring pattern other than one connected to the connection wiring pattern of the first light source board, respectively.

The second terminal portions of the second light source board and the third light source board are relay-connected to each other via the second relay component. The arrangements of the second connection terminals and the second through terminals in the second terminal portions are the same. The second relay component includes the crossing relay wiring patterns. Therefore, the second connection terminal of the connection wiring pattern of the second light source board can be connected to any one of the second terminals of the through wiring patterns of the third light source board. The second through terminal of the through wiring pattern of the second light source board connected to the connection wiring pattern of the first light source board can be connected to the second through terminal of the through wiring pattern of the third light source board other than one connected to the connection wiring pattern of the second light source board. The second through terminal of the through wiring pattern of the second light source board not connected to the connection wiring pattern of the first light source board can be connected to the second connection terminal of the connection wiring pattern of the third light source board.

As described above, the second relay component is prepared in addition to the first relay component that relay-connects the first terminal portion to the second terminal portion. The second terminal portions are connected via the second relay component. With this configuration, the flexibility in arrangement of the light source boards in the lighting device can be increased.

(5) The first light source board and the second light source board may be arranged such that the second terminal portion of the first light source board and the first terminal portion of the second light source board may be adjacent to each other. The second light source board and the third light source board may be arranged in a direction crossing an arrangement direction in which the first light source board and the second light source board may be arranged. The third light source board is arranged relative to the second light source board in the direction crossing the arrangement direction in which the first light source board and the second light source board are arranged. This configuration is preferable for increasing the size of the lighting device.

(6) The light source boards may include first connectors having the first terminal portions and second connectors having the second terminal portions. The first relay component and the second relay component may be plugged into the first connectors and the second connectors. With this configuration, the light source boards including the first connectors and the second connectors can be prepared as the same parts. Therefore, the manufacturing cost of the light source boards can be further reduced.

(7) At least one light guide member may be arranged opposite light emitting surfaces of the light sources. With the light guide member, light from the light sources can be directed to exit.

(8) The at least one light guide member may include a plurality of light guide members corresponding to the light source boards. The light guide members may be arranged parallel to each other. The light guide members are provided for the light source boards, respectively, and the light sources are driven by each light source board. With this configuration, light emissions can be controlled for each light guide member. In comparison to a configuration in which a single light guide member is used, the light guide members can be easily produced.

(9) The at least one light guide member may have a light entrance surface and a light exit surface. The light entrance surface may be opposite the light emitting surfaces and through which light enters. The light exit surface through which the light exits may extend in a direction crossing the light entrance surface and parallel to an arrangement direction in which the light sources and the light entrance surface are arranged. With this configuration, the light from the light sources arranged opposite the light entrance surface of the light guide member exits through the light exit surface that extends in a direction crossing the light entrance surface and parallel to the arrangement direction in which the light sources and the light entrance surface are arranged. This configuration is preferable for reducing the thickness of the lighting device.

(10) The light sources may be LEDs. With this configuration, high brightness can be achieved.

(11) A light source driver may be electrically connected to the light source boards. With this configuration, the light sources on the light source boards can be driven by the light source driver included in the lighting device.

To solve the problem described earlier, a display device according to the present invention includes the above lighting device and a display panel configured to provide display using light from the lighting device.

In the lighting device in such a display device, which supplies light to the display panel, the connection configurations between the light sources and the light source is simplified. Therefore, the manufacturing cost can be reduced.

An example of the display panel is a liquid crystal panel. Such a display device is applied to various uses such as a television or a desktop of a personal computer as a liquid crystal display device, and especially appropriate for a large-screen device.

Advantageous Effect of the Invention

According to the present invention, a connection configuration between a light source and a light source driver can be simplified.

BRIEF DESCRIPTION OF THE DRAWINGS

FIG. 1 is an exploded perspective view illustrating a general construction of a television receiver according to a first embodiment of the present invention.

MODE FOR CARRYING OUT THE INVENTION

First Embodiment

A first embodiment of the present invention will be explained with reference to FIGS. 1 to 7. In this description, a liquid crystal display device 10 will be illustrated. X-axes, Y-axes and Z-axes are indicated in some drawings. The axes in each drawing correspond to the respective axes in other drawings. The upper side and the lower side in FIGS. 3 and 4 correspond to the front side and the rear side, respectively.

Figure 2:
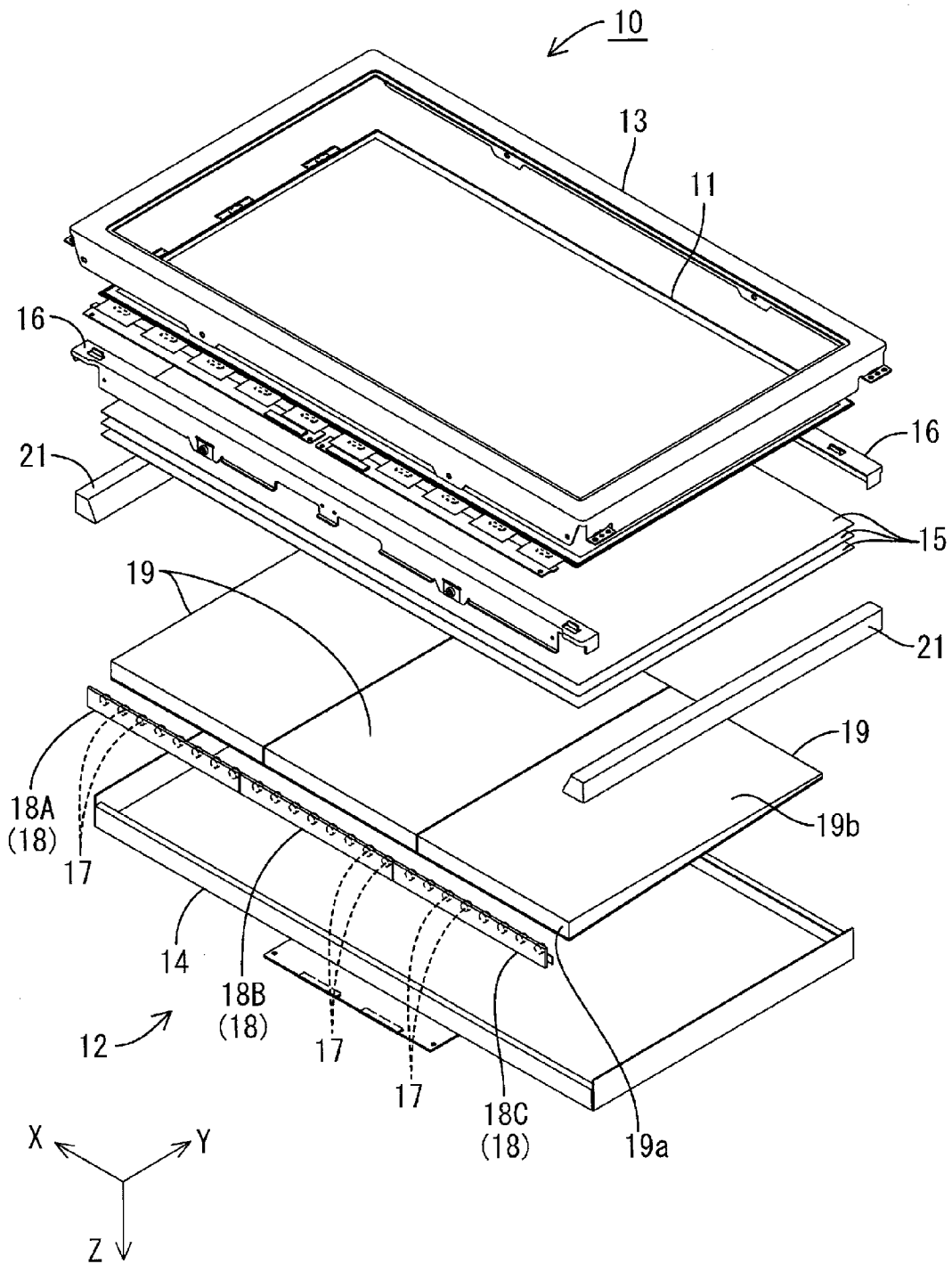
FIG. 2 is an exploded perspective view illustrating a general construction of a liquid crystal display device included in the television receiver.

As illustrated in FIG. 1, the television receiver TV of this embodiment includes the liquid crystal display device 10, front and rear cabinets Ca, Cb that house the liquid crystal display device 10 therebetween, a power source P, a tuner T, and a stand S. An overall shape of the liquid crystal display device (a display device) 10 is a landscape rectangular. The liquid crystal display device 10 is held in a vertical position. As illustrated in FIG. 2, it includes a liquid crystal panel 11 as a display panel, and a backlight unit (a lighting device) 12, which is an external light source. They are integrally held by a bezel 13 having a frame-like shape.

As illustrated in FIG. 2, the liquid crystal panel 11 has a rectangular plan-view shape. It is constructed such that a pair of glass substrates is bonded together with a predetermined gap therebetween and liquid crystals are sealed between the glass substrates. On one of the glass substrates, switching components (e.g., TFTs) connected to source lines and gate lines that are perpendicular to each other, pixel electrodes connected to the switching components, and an alignment film are provided. On the other substrate, a color filter having color sections such as R (red), G (green) and B (blue) color sections arranged in a predetermined pattern, counter electrodes, and an alignment film are provided. Polarizing plates are attached to outer surfaces of the substrates.

As illustrated in FIG. 2, the backlight unit 12 includes a chassis 14, optical members 15 and frames 16. The chassis 14 has a box-like shape and an opening on the light emitting side (on the liquid crystal panel 11 side). The optical members 15 are arranged so as to cover the opening of the chassis 14. The frames 16 are arranged along the outer edges of the chassis 14. The outer edges of the optical members 15 are sandwiched between the chassis 14 and the frames 16. LEDs 17 (light emitting diodes), LED boards 18 on which the LEDs 17 are mounted, light guide members 19, a reflection sheet 20, and a pair of holders 21 are arranged inside the chassis 14. The LEDs are a light source. Each light guide member 19 is configured to guide light from the LEDs 17 toward the optical members 15 (toward the liquid crystal panel 11). The reflection sheet 20 is arranged behind the light guide members 19. The edges of the optical members 14 and the liquid crystal panel 11 are placed on the holders 21. In the backlight unit 12, the light guide members 19 are arranged immediately behind the liquid crystal panel 10 and the optical members 15. The LED boards 18 including the LEDs 17 are arranged at edges of the light guide members 19. Namely, the backlight unit 12 is so-called edge light (or side light) type. Components of the backlight unit 12 will be explained in detail below.

Figure 3:
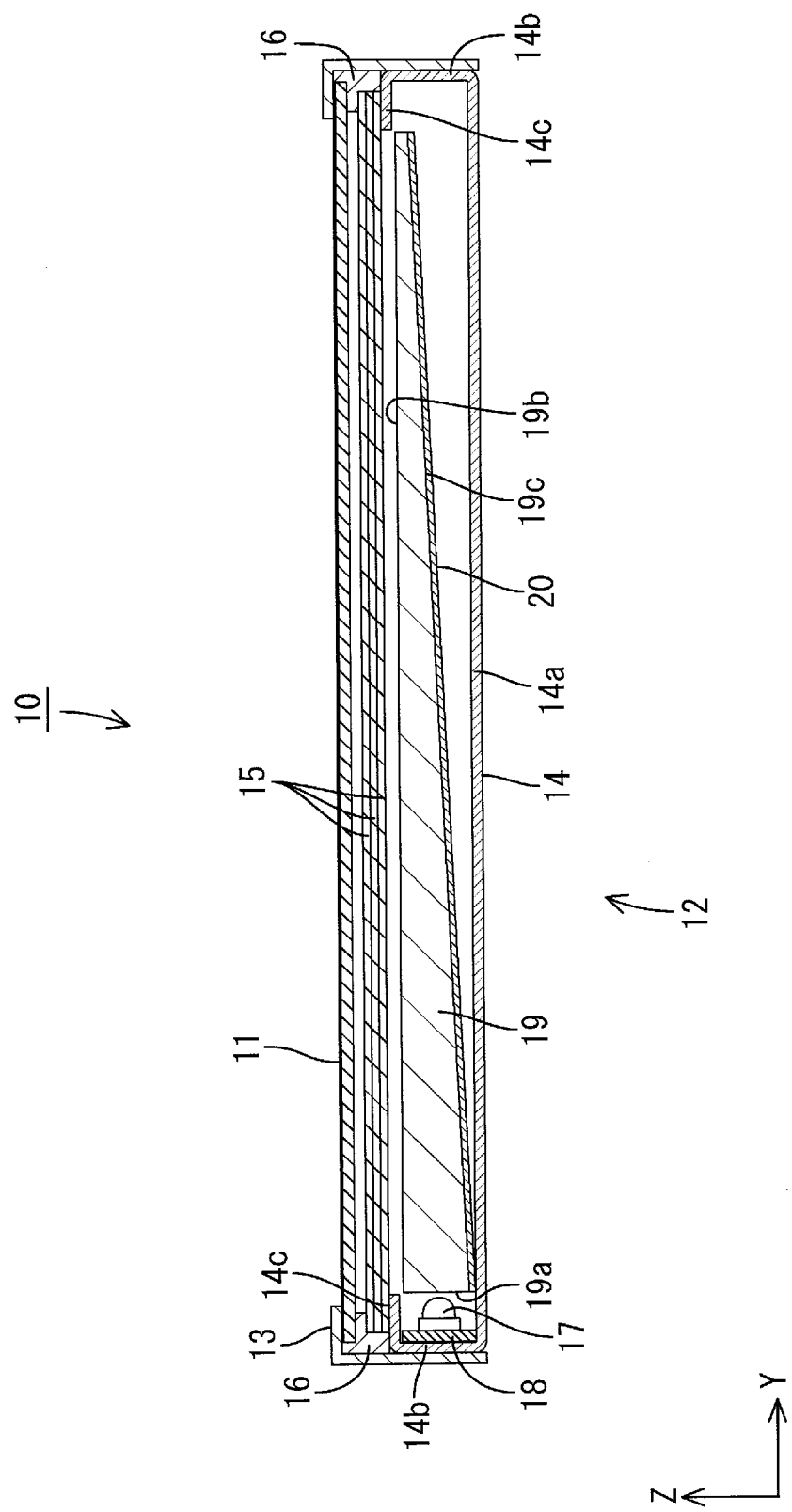
FIG. 3 is a cross-sectional view of the liquid crystal display device along the short-side direction thereof.
Figure 4:
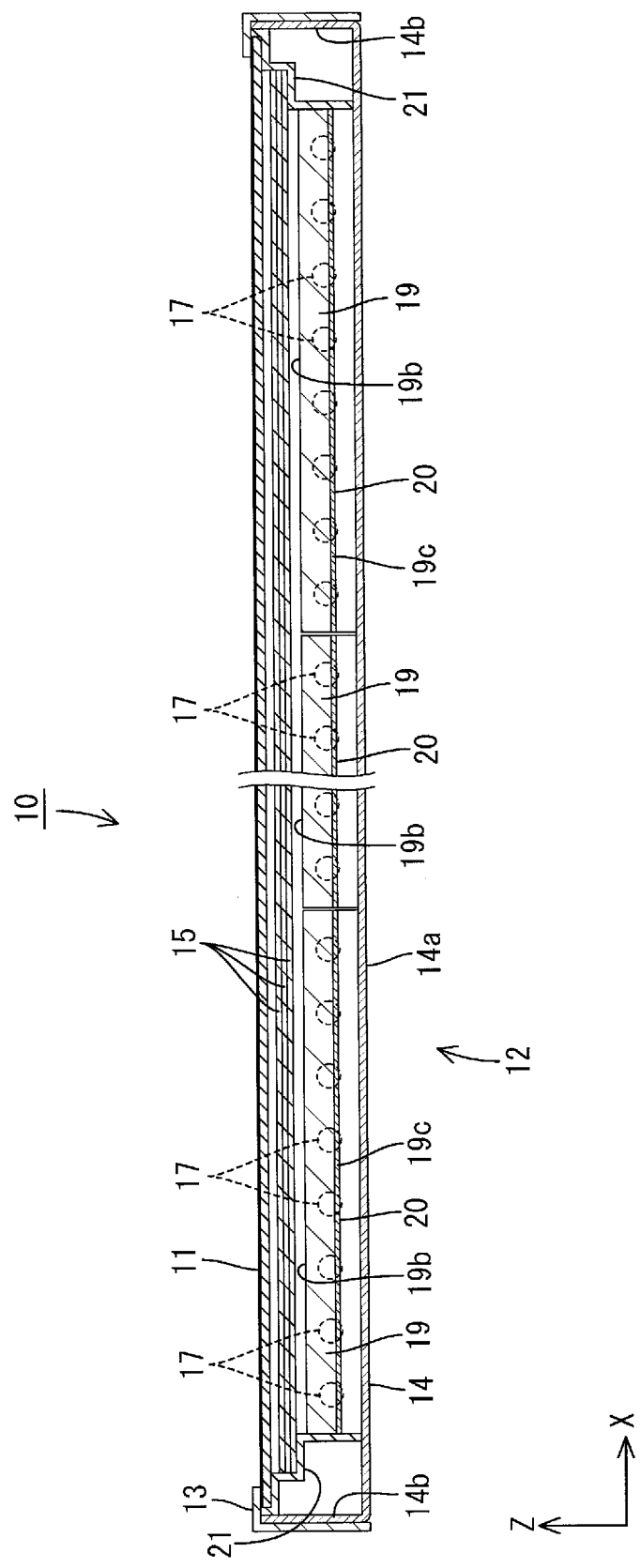
FIG. 4 is a cross-sectional view of the liquid crystal display device along the long-side direction thereof.

The chassis 14 is made of metal. As illustrated in FIGS. 3 and 4, the chassis 14 includes a bottom plate 14a, side plates 14b, and receiving plates 14c. The bottom plate 14a has a rectangular shape similar to the liquid crystal panel 11. Each side plate 14b rises from an outer edge of the corresponding side of the bottom plate 14a. Each receiving plate 14c projects from the top edge of the corresponding side plate 14b. The chassis 14 has a shallow-box-like overall shape with an opening on the front side. The chassis 14 is orientated with the long-side direction thereof aligned with the X-axis direction (the horizontal direction) and the short-side direction thereof aligned with the Y-axis direction (the vertical direction). The optical members 15, which will be explained next, are placed on the receiving plates 14d of the chassis 14 on the front side. The frames 16 are screwed to the receiving plate 14c.

As illustrated in FIG. 2, the optical member 15 has a rectangular plan-view shape similar to the liquid crystal panel 11 and the chassis 14. As illustrated in FIG. 3, the optical members 15 are arranged between the liquid crystal panel 11 and the light guide member 19 so as to cover the opening of the chassis 14 with the outer edges thereof placed on the receiving plates 14c. The optical members 15 are sheets and three of them are overlaid (see FIG. 2). Specific examples of the optical sheets may be a diffuser sheet, a lens sheet, and a reflection-type polarizing sheet. Appropriate types of sheets may be selected from the above type of sheets and used.

As illustrated in FIGS. 2 and 3, the frames 16 extend along the long sides of the chassis 14 and attached to front surfaces of the respective receiving plates 14c of the chassis 14. The long edges of the optical members 15 are sandwiched between the respective frames 16 and the respective receiving plates 14c. The frames 16 receive the outer edges of the liquid crystal panel 11 from the rear side.

The holders 21 are made of white synthetic resin. As illustrated in FIGS. 2 and 4, each holder 21 has an elongated box-like shape extending along the short side of the chassis 14. The holders 21 are arranged along the side plates 14b on the short sides of the chassis 14 and attached to the chassis 14. Each holder 21 has a stepped portion on the front side such that the optical members 15 and the liquid crystal panel 11 are held at different level. The short edges of the optical members 15 and the liquid crystal panel 11 are supported from the rear side.

As illustrated in FIGS. 2 and 3, each LED 17 is prepared by sealing an LED chip on a board fixed to the LED board 18 with a resin material. The LED chip mounted on the board has one kind of main emission wavelength. Specifically, the LED chip is a single light emitting chip configured to emit blue light. The resin material that seals the LED chip includes fluorescent substances that convert the blue light emitted by the LED chip to white light. The fluorescent substances are scattered in the resin material. With this configuration, the LEDs 17 emit white light. A surface of each LED 17 away from the mounting surface of the LED board 18 is a light emitting surface. Namely, the LED 17 is a top light-emitting-type LED.

As illustrated in FIGS. 2 and 3, each LED board 18 has an elongated plate-like shape extending along the long side of the chassis (the X-axis direction). The LED boards 18 are housed in the chassis 14 such that main planes thereof are parallel to the X-axis direction and the Z-axis direction. Namely, the LED boards 18 are housed in the chassis 14 such that the main planes thereof are perpendicular to the planes of the liquid crystal panel 11 and the optical members 15. A plurality of the LED boards 18 (three of them in this embodiment) are arranged inside the chassis 14 at one of the long sides of the chassis 14 and parallel to one another along the X-axis direction. The LED boards 18 are mounted to the inner surface of the side plate 14b on the long side. The LED boards 18 are arranged such that the long edges thereof are adjacent to each other. On a surface of each LED board 18 away from the side plate 14b, a plurality of the LEDs 17 having the configuration described earlier are surface-mounted. A plurality of the LEDs 17 (eight of them in this embodiment) are arranged in line (or linearly) on the main plane of each LED board 18. Namely, a plurality of the LEDs 17 are arranged along the long side of the backlight unit 12 at the end along the long side. The LED boards 18 are orientated such that the mount surfaces on which the LEDs 17 are mounted are parallel to the X-axis direction and the Z-axis direction, and such that the mount surfaces face the other side from the side plate 14b. Therefore, the light axes of the LEDs 17 mounted on the LED boards 18 are substantially aligned with the Y-axis direction and light is emitted from the LEDs 17 in the same direction (to the side opposite from the side plate 14b).

A substrate of each LED board 18 is made of metal, for instance, aluminum-contained material similar to the chassis 14. On the surface of the substrate, metal-film wiring patterns including copper foil wiring patterns are formed via an insulating film. The wiring patterns and a connection configuration of the wiring patterns to external components will be explained in detail later. A material for the substrates of the LED boards 18 may be an epoxy resin-base insulating material.

Each light guide member 19 is made of synthetic resin having a refractive index sufficiently higher than that of air and substantially clear (i.e., having high capability of light transmission). An example of synthetic resin is acrylic. As illustrated in FIGS. 2 and 3, a plurality of the light guide members 19 are disposed inside the chassis 14 behind the liquid crystal panel 11 and the optical members 15 (three of them in this embodiment). The light guide members 19 are arranged along the X-axis direction, that is, the arrangement direction of the LED boards 18. The number of the light guide members 19 is equal to that of the LED boards 18. The X dimension of each light guide member 19 is substantially equal to that of the LED board 18. The arrangement direction of the LEDs (or the LED board 18) and the corresponding light guide member 19 is aligned with the Y-axis direction. The arrangement direction of the optical members 15 (or the liquid crystal panel 11) and each light guide member 19 is aligned with the Z-axis direction. Namely, the arrangement directions are perpendicular to each other. Each light guide member 19 is configured to receive light emitted from each LED 17 in the Y-axis direction and to direct the light toward the optical member 15 such that the light rises in the Z-axis direction and exits the light guide member 19. An air layer having a refractive index lower than that of the light guide member 19 is provided between the adjacent light guide members 19. Therefore, light inside each light guide member 19 is substantially fully reflected at an interface between the light guide member 19 and the air layer, and the light is less likely to travel between the adjacent light guide members 19.

Each light guide member 19 has a rectangular plan view shape. The light guide member 19 has a wedge cross section along the Y-axis direction, that is, the thickness thereof is relatively large at an edge of the Y dimension closer to the LEDs 17 and relatively small at an edge of the Y dimension away from the LEDs 17. A surface of the light guide member 19 opposite light emitting surfaces of the LEDs 17 (of the mounting surface of the LED board 18) at the above-described end having the relatively large thickness is a light entrance surface 19a. Light from the LEDs 17 enters the light guide member 19 through the light entrance surface 19a. A main plane surface of each light guide member 19 on the front side, that is, a surface opposite the optical member 15 is a light exit surface 19b through which light inside the light guide member 19 exits. The light entrance surface 19a is along the X-Z plane and perpendicular to the plane surfaces of the liquid crystal panel 11 and the optical members 15. The light exit surface 19b is along the plane surfaces of the liquid crystal panel 11 and the optical members 15 (the X-Y plane) and perpendicular to the light entrance surface 19a. The arrangement direction of the LEDs 17 and the light entrance surface 19a (the Y-axis direction) is parallel to the light exit surface 19b.

The reflection sheet 20 is arranged on a main plane surface of each light guide member 19 on the rear side, that is, a surface 19c opposite from the light exit surface 19b. The reflection sheet 20 is configured to reflect light inside the light guide member 19 toward the front side. The surface 19c on which the reflection sheet 20 is arranged is angled with respect to the Y-axis direction. The surface 19c has microscopic asperities (not illustrated) for scattering light. Light traveling inside the light guide member 19 is scattered and reflected by the surface 19c on which the reflection sheet 20 is arranged, or scattered by the surface 19c and reflected by the reflection sheet 20 toward the front side and reach the light exit surface 19b. Some rays of light enter the light exit surface 19b with angles of incidence smaller than the critical angle. Those rays of light exit to the outside through the light exit surface 19b. The asperities have a distribution such that a degree of scattering of light increases as a distance from the LEDs 17 increases. This makes light exiting from the light exit surface 19b even within the light exit surface 19b.

Figure 6:
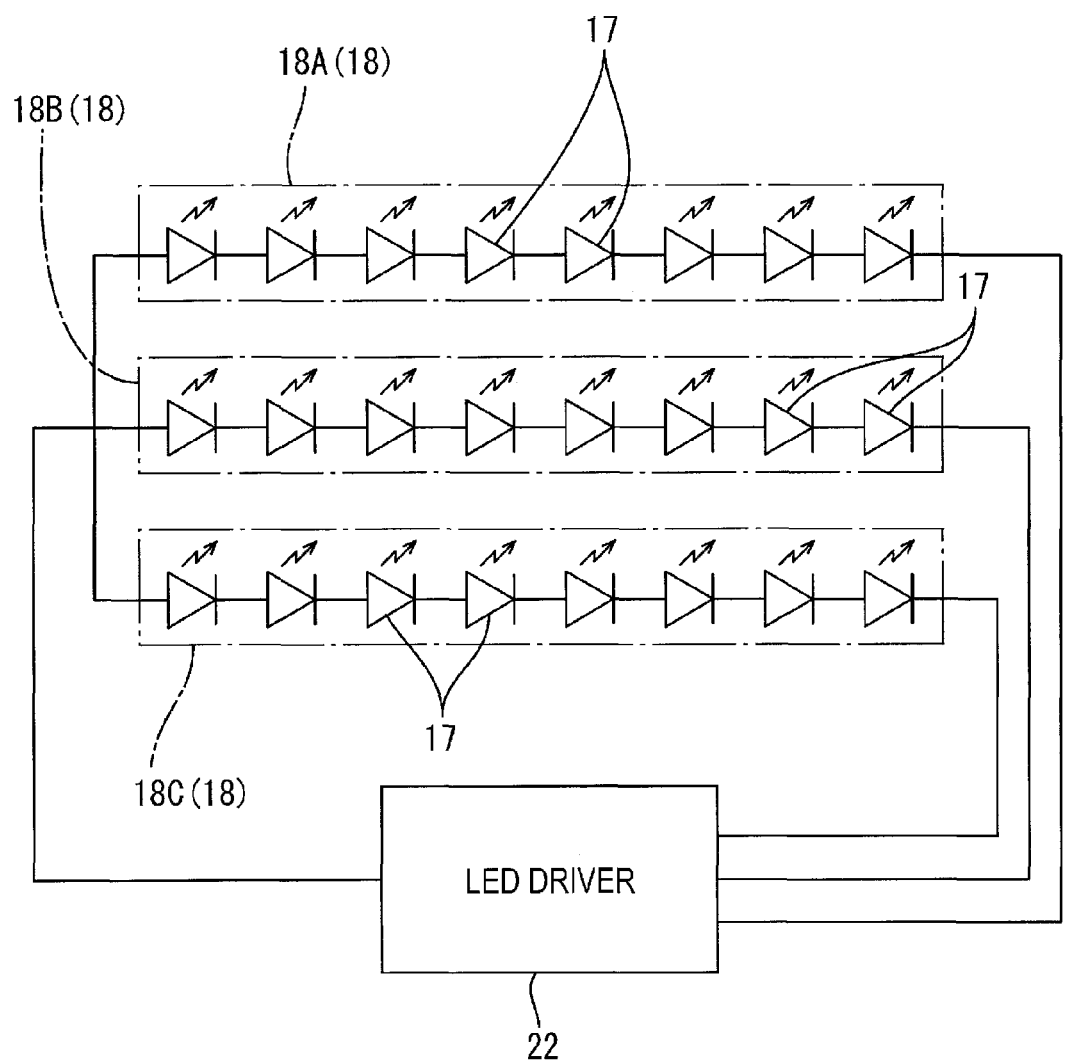
FIG. 6 is a schematic circuit diagram of an LED drive circuit.

Next, a drive circuit (a lighting circuit) for the LEDs 17 will be explained. As illustrated in FIG. 6, the backlight unit 12 according to this embodiment includes a number of the LEDs 17 (twenty four of them) that are divided into a plurality of groups. The groups of the LEDs 17 are connected in parallel to an LED driver 22 configured to drive and control the LEDs 17. The LEDs 17 in each group are driven in series. With this configuration, a drive voltage required for driving the LEDs 17 can be maintained at a low level. Specifically, the LEDs 17 are divided into three groups for the respective LED boards 18. Each group of the LED 17 includes eight LEDs 17 connected in series and mounted on the LED board 18. Each of three LED boards 18 has a connection configuration and wiring patterns such that the groups of the LEDs 17 each including eight LEDs 17 connected in series are connected in parallel to the LED driver 22. The connection configuration and wiring patterns will be explained in detail below.

Figure 5:
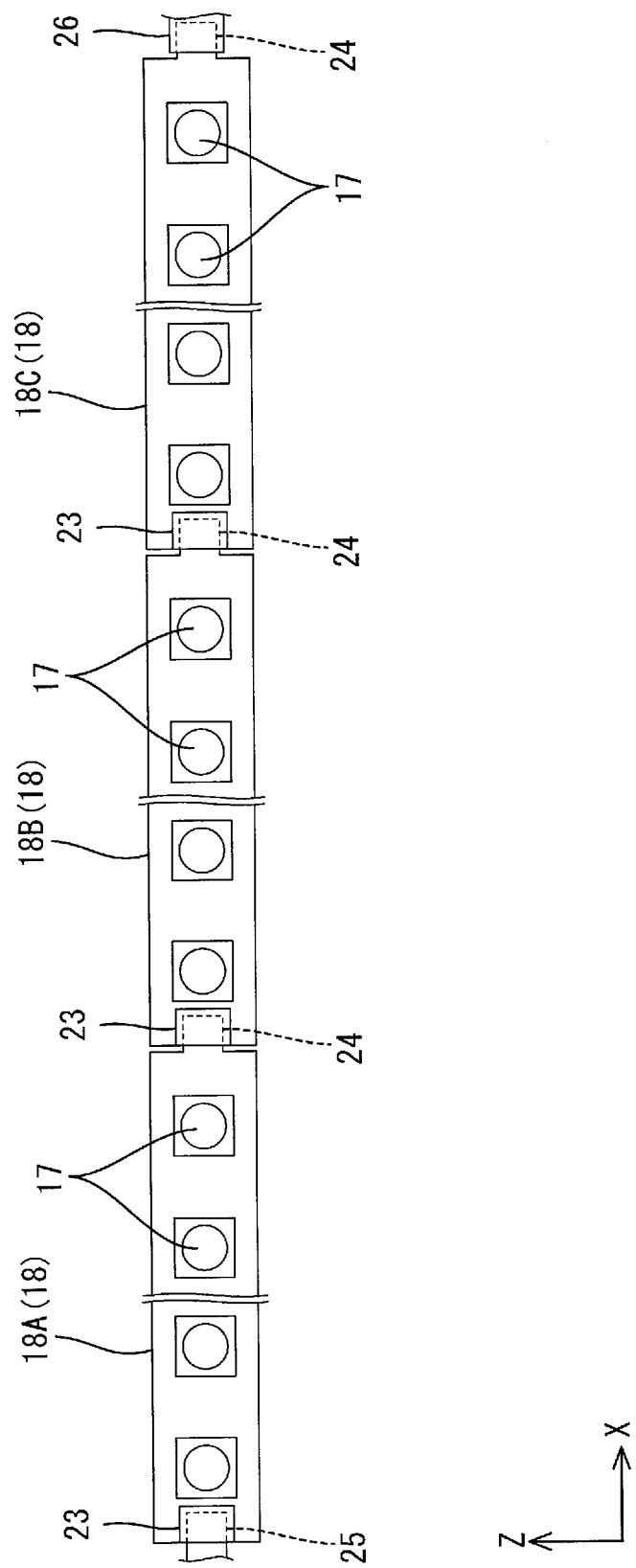
FIG. 5 is a front view of LED boards illustrating a connection of the LED boards.

First, the connection configuration of the LED boards 18 to the outside will be explained. As illustrated in FIG. 5, at an edge of the long side of each LED board 18 (at the left edge in FIG. 5), a connector 23 is integrally provided. At the other edge (the right edge in FIG. 5), a connection joint 24 plugged in the connector 23 is integrally provided. The connector 23 can receive the connector joint 24 or an input FPC 25 connected to the LED driver 22. The connector joint 24 can be plugged in the connector 23 or an output connector 26 connected to the LED driver 22. The connector 23 and the connector receptacle 24 include terminals formed at ends of the wiring patterns, which will be explained later. When the connector joint is plugged to the connector 23, the terminals are electrically in contact with each other.

Three LED boards 18 arranged inside the chassis 14 are parallel to each other such that the connectors 23 and the connector joints 24 are adjacent to each other. When the connector joints 24 are plugged in the adjacent connectors 23, respectively, the LED boards 18 are electrically connected to each other. Among three LED boards 18, the LED board 18 having the connector 23 in which the input FPC 25 is plugged is referred to as a first LED board 18A. The LED board 18 having the connector joint 24 plugged in the output connector 26 is referred to as a third LED board 18C, and the LED board 18 arranged between the first LED board 18A and the third LED board 18C is referred to as a second LED board 18B. The LED driver 22 is included in the drive circuit board arranged on the rear surface of the chassis 14 and electrically connected to the LED boards 18 via the input FPCs 25 and the output connectors 26. In the following descriptions, the LED boards 18 may be indicated by 18 followed by letter A, B or C for describing the first LED board, the second LED board, and the third LED board as different parts. For describing the LED boards 18 as a whole, the letter will not be followed.

Figure 7:
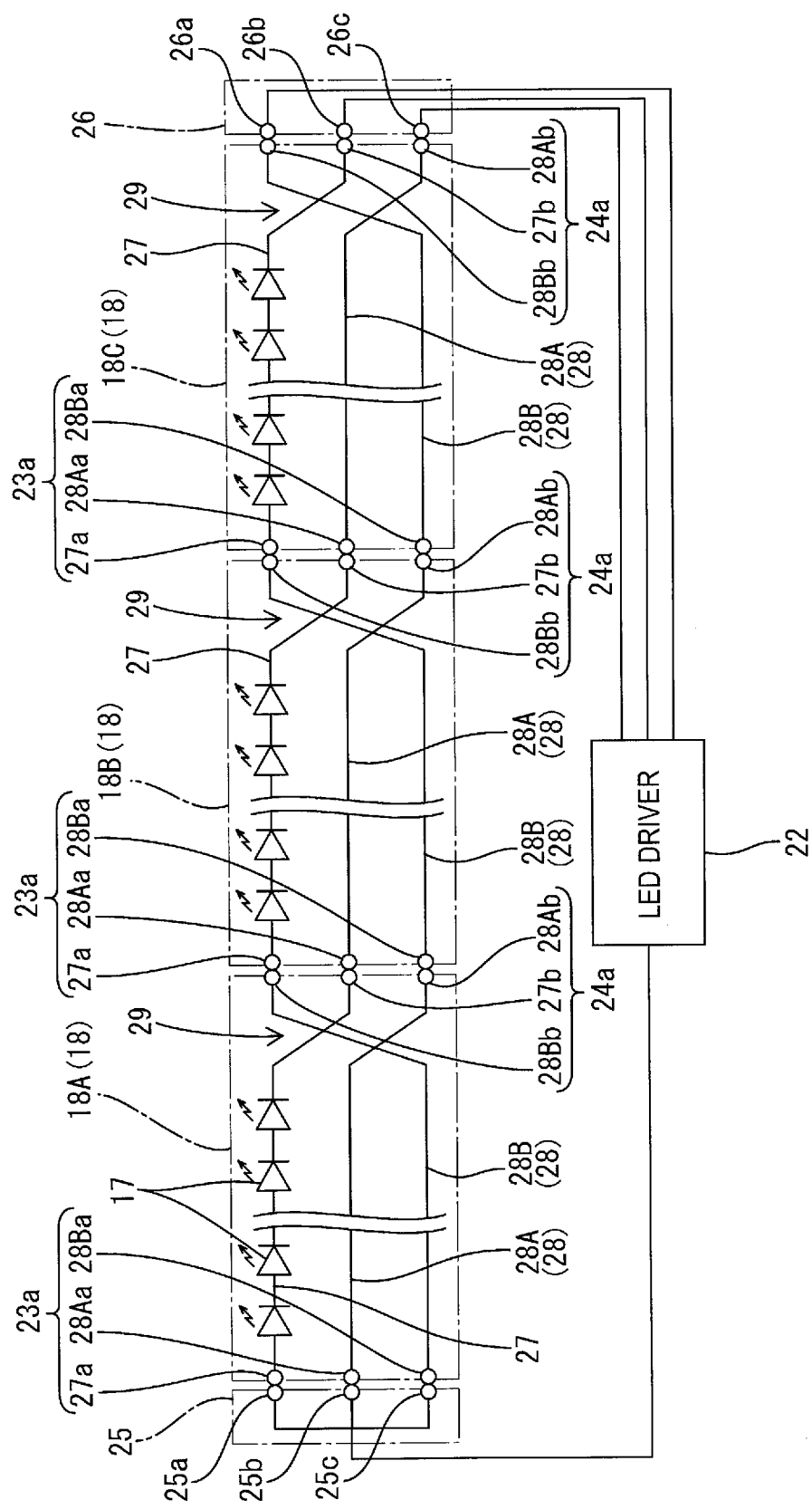
FIG. 7 is a detailed circuit diagram of the LED drive circuit.

Next, the wiring patterns formed on each LED board 18 will be explained. As illustrated in FIG. 7, the wiring patterns include connection wiring pattern 27 and through wiring patterns 28. The connection wiring pattern 27 connects eight LEDs 17 mounted on the LED board 18 each other. The through wiring patterns 28 are not electrically connected to the LEDs 17. The connection wiring pattern 27 crosses eight LEDs 17 and connects all LEDs 17 in series. An end of the connection wiring pattern 27 is a first connection terminal 27a provided at the connector 23 and the other end is a second connection terminal 27b provided at the connector joint 24. The through wiring patterns 28 are not electrically connected to any of eight LEDs 17 and extends across the LED board 18 in the long-side direction. Two through wiring patterns 28 are provided according to the number of the other LED boards 18 (i.e., the total number of the LED boards 18 minus one). The wiring patterns 28 include a first through wiring pattern 28A and a second through wiring pattern 28B. In the following descriptions, the through wiring patterns 28 may be indicated by 28 followed by letter A or B for describing the first through wiring pattern and the second through wiring pattern as different parts. For describing the through wiring patterns 28 as a whole, the letter will not be followed.

An end of the first through wiring pattern 28A is a first terminal 28Aa of the first through wiring pattern 28A and the other end is a second terminal 28Ab of the first through wiring pattern 28A. The first terminal 28Aa is provided at the connector 23 and the second terminal 28Ab is provided at the connector joint 24. Similarly, an end of the second through wiring pattern 28B is a first terminal 28Ba of the second through wiring pattern 28B and the other end is a second terminal 28Bb of the first through wiring pattern 28B. The first terminal 28Ba is provided at the connector 23 and the second terminal 28Bb is provided at the connector joint 24. The connector 23 includes a first terminal portion 23a in which a first connection terminal 27a, the first terminal 28Aa of the firth through wiring pattern 28A and the first terminal 28Ba of the second through wiring patterns 28B are arranged parallel to and adjacent to each other. The connector joint 24 includes a second terminal portion 24a in which a second connection terminal 27b, the second terminal 28Ab of the first through wiring pattern 28A and the second terminal 28Bb of the second through wiring pattern 28B are parallel to and adjacent to each other. The first terminal portions 23a and the second terminal portions 24a are input terminal portions and output terminal portions, respectively, for the respective LED boards 18A to 18C. Each input FPC 25 includes a first input terminal 25a, a second input terminal 25b and a third input terminal 25c. Each output connector 26 includes a first output terminal 26a, a second output terminal 26b and a third output terminal 26c. A wiring pattern connected to the LED driver 22 is divided into three and connected to the input terminals 25a o 25c of the input FPC 25. The output terminals 26a to 26c of the output connector 26 are connected to the LED driver 22 via individual wiring patterns.

The connection wiring pattern 27 and the through wiring patterns 28 of each LED board 18 includes intersections 29 such that the arrangement of the first terminals 27a, 28Aa and 28Ba at the first terminal portion 23a is different from the arrangement of the second terminals 27b, 28Ab and 28Bb at the second terminal portion 24a. Specifically, the intersections 19 are located between the LED 17 the closest to the connector joint 24 of each LED board 18 and the second terminal portion 24a. At the intersections 29, the second through wiring pattern 28B crosses the connection wiring pattern 27 and the first through wiring pattern 28A, respectively, which are parallel to each other. At the intersections 29, insulating layers (not illustrated) are provided between the wiring patterns 27, 28A and 28B and thus the wiring patterns 27, 28A and 28B are isolated from each other. At the first terminal portion 23a, the first connection terminal 27a, the first terminal 28Aa of the first through wiring pattern 28A, and the first terminal 28Ba of the second through wiring pattern 28B are arranged in this sequence from the upper side in FIG. 7. In the second terminal portion 24a, the second terminal 28Bb of the second through wiring pattern 28B, the second connection terminal 27b, and the second terminal 28Ab of the first through wiring pattern 28A are arranged in this sequence from the upper side in FIG. 7. The terminals at the first terminal portion 23a and the second terminal portion 24a are arranged as described above. When the connector joint 24 is plugged into the connector 23, the second terminal 28Bb of the second through wiring pattern is brought into contact with the first terminal 27 of the connection wiring pattern 27. Moreover, the second connection terminal 27b and the second terminal 28Ab of the first through wiring pattern 28A are brought into contact with the first terminal 28Aa of the first through wiring pattern 28A and the first terminal 28Ba of the second through wiring pattern 28B, respectively. As a result, they are electrically connected to each other.

Three LED boards 18A to 18C are arranged parallel to each other and the connectors 23 and the adjacent connector joints 24 are connected. The connection wiring pattern 27 on the first LED board 18A is connected to the first through wiring pattern 28A on the second LED board 18B and the second through wiring pattern 28B on the third LED board 18C. The connection wiring pattern 27 on the second LED board 18B is connected to the second through wiring pattern 28B on the first LED board 18A and the first through wiring pattern 28A on the third LED board 18C. The connection wiring pattern 27 on the third LED board 18C is connected to the first through wiring pattern 28A on the first LED board 18A and the second through wiring pattern 28B on the second LED board 18B. The connection wiring patterns 27 on the LED boards 18A to 18C are connected to the LED driver 22 via the through wiring patterns 28 on the LED boards 18A to 18C. The series of the LEDs 17 connected by the respective connection wiring patterns 27 are connected in parallel with each other but each series of the LEDs 17 can be driven in series. The LED boards 18A to 18C have the same wiring patterns, the same LEDs 17, the same connectors 23, and the same connector joints 24, that is, they are the same parts. Therefore, the LED boards 18 can be produced at low cost.

This embodiment has the configurations described above. Next, operations will be explained. When the liquid crystal display device 10 is turned on, driving of the liquid crystal panel 11 is controlled by a control circuit, which is not illustrated. Furthermore, driving of the LEDs 17 in the backlight unit 12 is controlled. As a result, the liquid crystal panel 11 is illuminated and specified images are displayed on the liquid crystal panel 11. Next, operations of the backlight unit 12 will be explained in detail.

When the LEDs 17 are tuned on, rays of light emitted from the LEDs 17 enter the light guide members 19 through the light entrance surfaces 19a as illustrated in FIG. 3. Then, the rays of light travel inside the light guide members 19 while totally reflected by the interfaces with the air layers outside. When the rays of light reach the surfaces 19c on which the reflection sheet 20 is arranged, they are reflected and scattered due to the asperities formed on the surfaces 19c, or reflected by the reflection sheet 20 toward the front side after scattered. The rays of light area scattered and directed toward the front side reach the light exit surfaces 19b. Therefore, angles of incident do not exceed the critical angle. Namely, the rays of light exit from the light exit surfaces 19b. The exit rays of light from the light guide members 19 are formed into even planar light through the optical members 15, and the liquid crystal panel 11 is illuminated with the planar light.

Operations of the drive circuit for the LEDs 17 will be explained. As illustrated in FIG. 6, drive voltages are applied to the groups of the LEDs 17 on the respective LED boards 18 by LED driver 22. The LEDs 17 in each group are driven in series and turned on. The LEDs 17 are divided into groups connected in parallel and the LEDs 17 in each group are driven in series. With this configuration, only a small voltage is required for driving the LEDs 17 in each group.

As illustrated in FIG. 7, each of the LED boards 18A to 18C includes two through wiring patterns 28 not connected to the LEDs 17 according to the number of the other LED boards 18 in addition to the connection wiring pattern 27 connected to the LEDs 17 mounted thereon. The second through wiring pattern 28B crosses the connection wiring pattern 27 and the first through wiring pattern 28A parallel to each other and form the intersections 29. Therefore, the arrangement of the first terminals 27a, 28Aa and 28Ba of the first terminal portion 23a provided at the connector 23 is different from the arrangement of the second terminals 27b, 28Ab and 28Bb of the second terminal portion 24a provided at the connector joint 24. When the connector joint 24 is plugged into the connector 23, the second terminal 28Bb is connected to the first connection terminal 27a, the second connection terminal 27b is connected to the first terminal 28Aa of the first through wiring pattern 28A, and the second terminal 28Ab of the first through wiring pattern 28A is connected to the first terminal 28Ba of the second through wiring pattern 28B.

The detailed connection configurations of the LEDs 17 on the LED boards 18A to 18C with respect to the LED driver 22 are as follows. The LEDs 17 on the first LED board 18A are connected to the LED driver 22 via the connection wiring pattern 27 on the first LED board 18A, the first through wiring pattern 28A of the second LED board 18B and the second through wiring pattern 28B of the third LED board 18C. The LEDs 17 on the second LED board 18B are connected to the LED driver 22 via the connection wiring pattern 27 of the second LED board 18B, the second through wiring pattern 28B of the first LED board 18A, and the first through wiring pattern 28A of the third LED board 18C. The LEDs 17 on the third LED board 18C are connected to the LED driver 22 via the connection wiring pattern 27 of the third LED board 18C, the first through wiring pattern 28A of the first LED board 18A, and the second through wiring pattern 28B of the second LED board 18B. For connecting the LEDs 17 on the LED boards 18A to 18C to the LED driver 22, the through wiring patterns 28 of other LED boards 18 are used. In comparison to configurations in which input and output wiring patterns of the LED driver 22 are individually connected to the LED boards, the number of wiring patterns can be reduced and wirings are easier. Therefore, a manufacturing cost can be reduced.

The backlight unit 12 of this embodiment described above includes a plurality of the LED boards 18 on which the LEDs 17, which are light sources, are mounted. On each LED board 18, the connection wiring pattern 27 electrically connected to the LEDs 17 mounted on the LED board 18 and the through wiring patterns 28 not electrically connected to the LEDs 17 mounted on the LED board 18 are provided. The through wiring patterns 28 on the other LED board 18 are electrically connected to the connection wiring pattern 27.

The connection wiring pattern 27 of each LED board 18 electrically connected to the LEDs 17 mounted on the LED board 18 is electrically connected to the through wiring patterns 28 of the other LED board 18, which are not electrically connected to the LEDs 17 thereon. The LEDs 17 mounted on the specific LED board 18 are electrically connected to the external LED driver 22 via the connection wiring pattern 27 and the through wiring patterns 28 of the other LED boards 18 and driven. Namely, the LEDs 17 are connected to the external LED driver 22 via the through wiring patterns 28 of the other LED board 18. In comparison to configurations in which each LED board includes extra wiring patterns connected to the external LED driver 22, the connection configurations can be simplified and thus the workability improves.

The first terminal portion 23a and the second terminal portion 24a are provided at one of the ends of each LED board 18 and the other end, respectively. In the first terminal portion 23a, the first connection terminal 27a and the first terminals 28Aa and 28Ba are adjacently arranged. The first terminal 27a is provided at the end of the connection wiring pattern 27. The first terminals 28Aa and 28Ba are provided at the ends of the through wiring patterns 28, respectively. In the second terminal portion 24a, the second connection terminal 27b and the second through terminals 28Ab and 28Bb are adjacently arranged. The second terminal 27b is provided at the other end of the connection wiring pattern 27. The second terminals 28Ab and 28Bb are provided at the other ends of the through wiring patterns 28. The connection wiring pattern 27 and the through wiring patterns 28 have the intersections 29 such that the arrangement of the first connection terminal 27a and the first through terminals 28Aa and 28Ba in the first terminal portion 23a is different from the arrangement of the second connection terminal 27b and the second terminals 28Ab and 28Bb in the second terminal portion 24a.

For electrically connecting the specific LED board 18 to the other LED board 18, the second terminal portion 24a of the specific LED board 18 is connected to the first terminal portion 23a of the other LED board 18. Because the connection wiring pattern 27 and the through wiring patterns 28 have the intersections 29, the arrangement of the second connection terminal 27b and the second through terminals 28Ab and 28Bb in the second terminal portion 24a of the specific LED board 18 is different from the arrangement of the first connection terminal 27a and the first through terminals 28Aa and 28Ba in the first terminal portion 23a of the other LED board 18. When the first terminal portion 23a is connected to the second terminal portion 24a, the second connection terminal 27b is connected to one of the first through terminals 28Aa and 28Ba. Moreover, the one of the second through terminals 28Ab and 28Bb is connected to the first terminal 27a. As a result, the connection wiring pattern 27 of the specific LED board 18 is connected to the through wiring pattern 28 of the other LED board 18. Moreover, the through wiring pattern 28 of the specific board 18 is connected to the connection wiring pattern 27 of the other LED board 18. Therefore, the connection wiring patterns 27 and the through wiring patterns 28 are connected to one another even though the LED boards 18 have the same wiring configurations. With this configuration, the manufacturing cost of the LED boards 18 can be reduced.

The LED boards 18 include the first LED board 18A, the second LED board 18B, and the third LED board 18C. Each of the LED boards 18 includes at least two through wiring patterns 28. The connection wiring pattern 27 on the first LED board 18A is connected to one of the through wiring patterns 28 of the second LED board 18B and one of the through wiring patterns 28 of the third LED board 18C. The at least two through wiring patterns 28 of the first LED board 18A are connected to the connection wiring pattern 27 of the second LED board 18B, the through wiring pattern 28 other than the one connected to the connection wiring pattern 27 of the first LED board 18A, the through wiring pattern 28 of the third LED board 18C other than the one connected to the connection wiring pattern 27 of the first LED board 18A or the connection wiring pattern 27 of the third LED board 18C. With this configuration, three or more LED boards 18 can be properly connected.

Each LED board 18 includes the connector 23 and the connector joint 24. The connector 23 has the first terminal portion 23a. The connector joint 24 has the second terminal portion 24a and the connector 23 of the other LED board 18 is plugged thereinto. In comparison to configurations in which relay components are provided separately from the LED boards 18 and the terminals are connected via the relay components, the number of the components can be reduced and the cost can be reduced.

The light guide members 19 are arranged opposite the light emitting surfaces of the LEDs 17. With this configuration, light from the LEDs 17 can be directed by the light guide members 19 to exit.

A plurality of the light guide members 19 are provided for a plurality of the LED boards 18 and arranged parallel to each other. The light guide members 19 are provided for the LED boards 18, respectively, and the LEDs 17 on the respective LED boards 18 are separately driven. With this configuration, emissions of light from the light guide members 19 can be individually controlled for each light guide member 19. In comparison to a configuration in which a single large light guide member is used, the light guide members 19 can be easily prepared.

Each light guide member 19 has the light entrance surface 19a and the light exit surface 19b. The light entrance surface 19a is opposite the light emitting surface and light enters through the light entrance surface 19a. The light exit surface 19b extends in a direction that crosses the light entrance surface 19a and parallel to the arrangement direction in which the light entrance surface 19a is arranged relative to the LEDs 17. The light exits from the light exit surface 19b. With this configuration, the light emitted from the LEDs 17 arranged opposite the light entrance surface 19a of the light guide member 19 can exit from the light exit surface 19b extending in the direction that crosses the light entrance surface 19a and parallel to the direction in which the light entrance surface 19a is arranged relative to the LEDs 17. This configuration is preferable for the backlight unit 12 with a small thickness.

The LEDs 17 are provided as light sources. Therefore, high brightness can be achieved. Furthermore, the LED driver 22 electrically connected to a plurality of the LED boards 18 is provided. With this configuration, the LEDs 17 on the plurality of the LED boards 18 can be driven by the LED driver 22 included in the backlight unit 12.

Second Embodiment

The second embodiment of the present invention will be explained with reference to FIGS. 8 to 10. In this embodiment, LED boards 118 and light guide members 119 in different numbers and locations from the first embodiment are used. The LED boards 118 have different connection configurations and different wiring patterns from the first embodiment. Similar configurations, operations, and effects to those of the first embodiment will not be explained.

Figure 8:
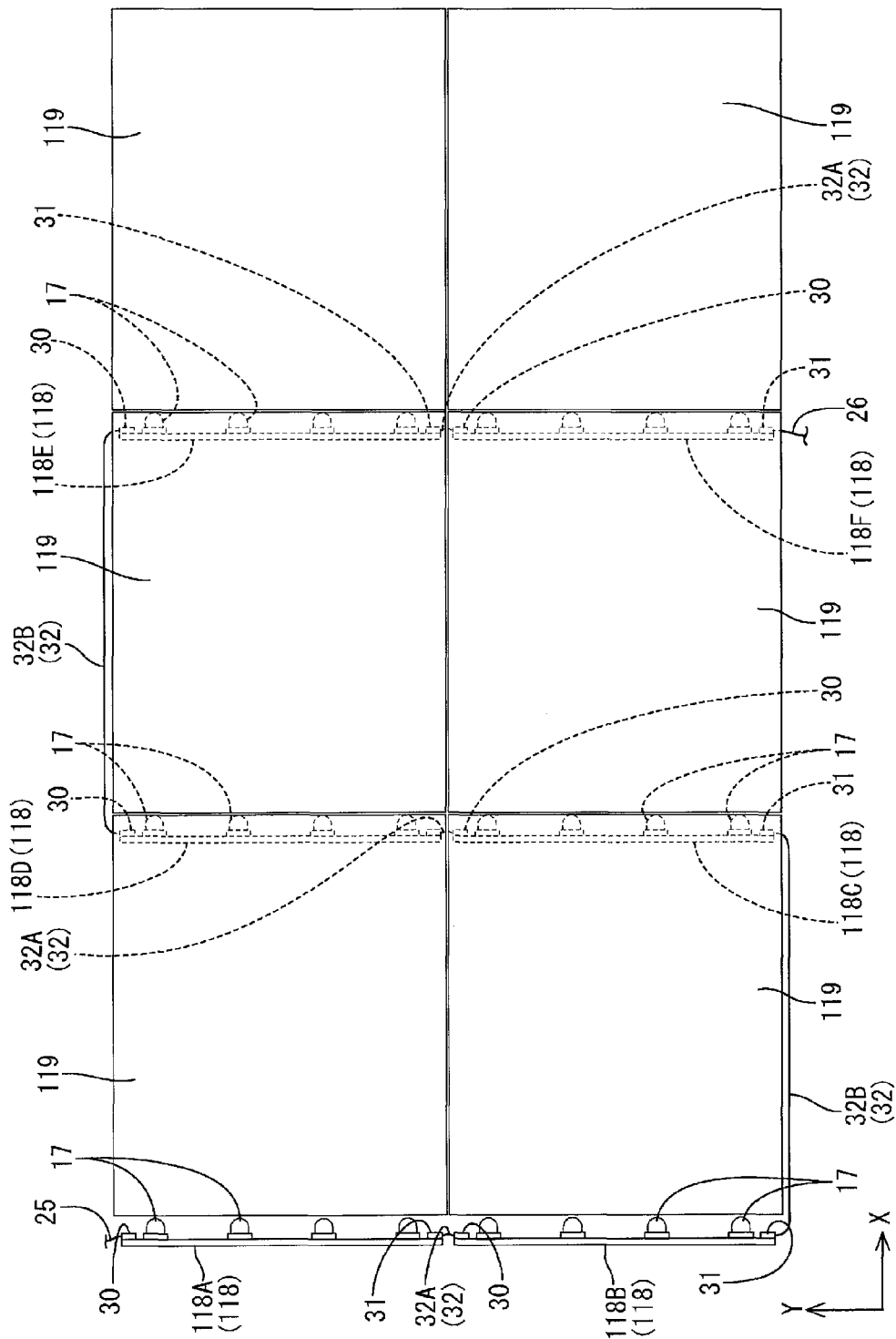
FIG. 8 is a plan view illustrating a planar arrangement of LED boards and light guide members according to a second embodiment of the present invention.
Figure 9:
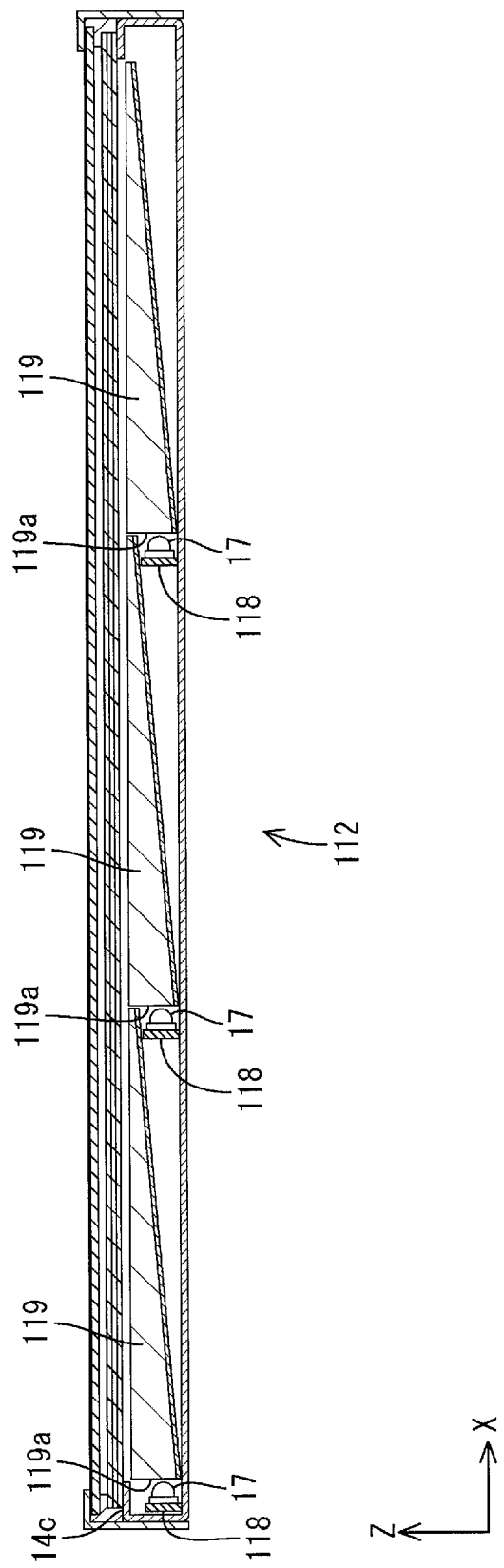
FIG. 9 is a cross-sectional view of a liquid crystal display device along the short-side direction thereof.
Figure 10:
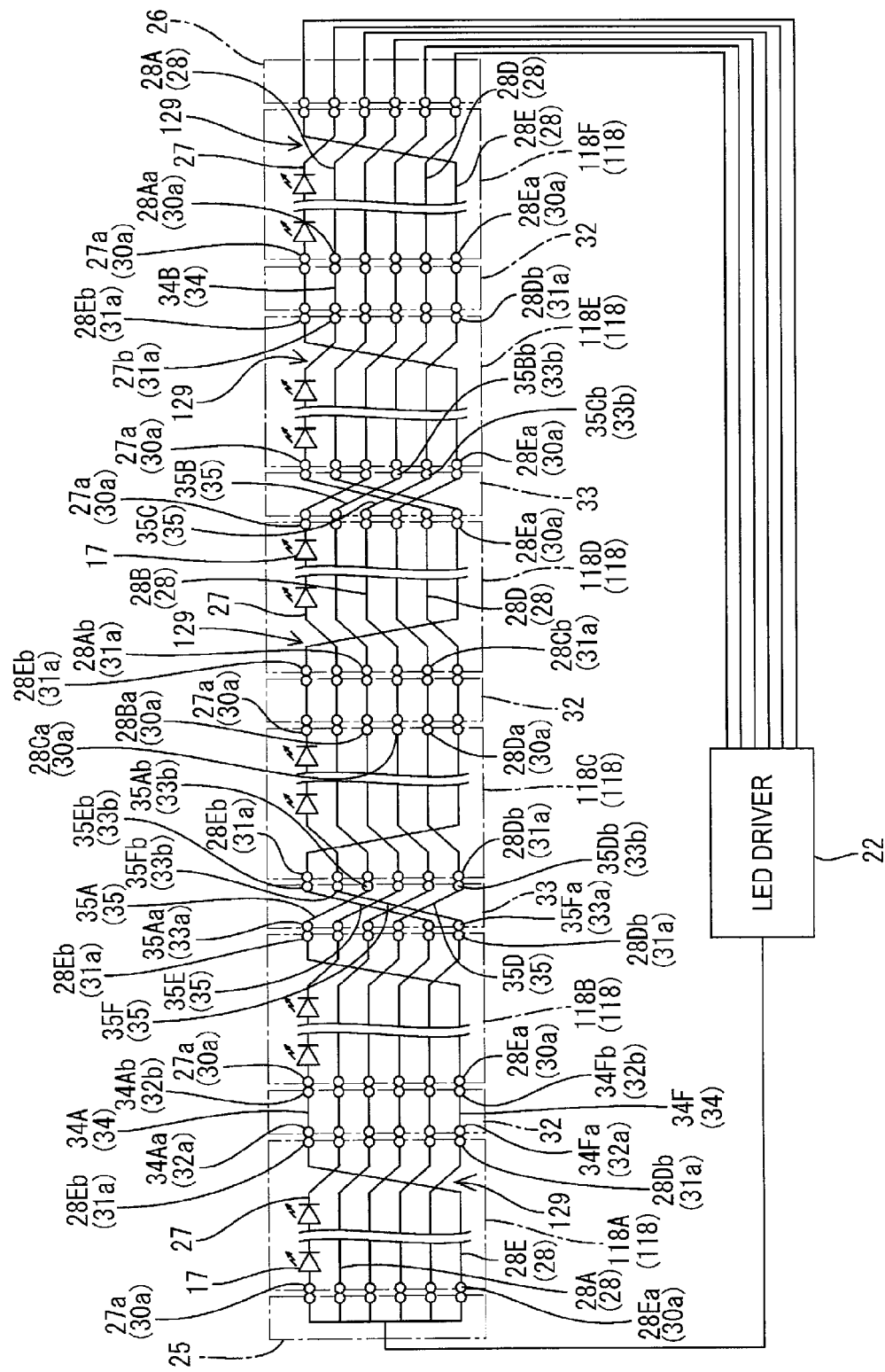
FIG. 10 is a detailed circuit diagram of an LED drive circuit.

As illustrated in FIGS. 8 and 9, two LED boards 118 and two light guide members 119 along the Y-axis direction by three LED boards 118 and three light guide members 119 along the X-axis direction, that is, a total of six LED boards 118 and a total of six light guide members 119 are arranged parallel to each other. Each LED board 118 includes four LEDs 17 mounted thereon. The LED boards 118 are arranged with light emitting directions of the LEDs 17 are all aligned in the same direction toward the right side in FIGS. 8 and 9. The light guide members 119 are arranged with all light entrance surfaces 119a facing the left side in FIGS. 8 and 9 (toward the LEDs). The LED boards 118 are separated from each other in the X-axis direction. The light guide members 119 are arranged between the respective LED boards 118 adjacently arranged in the X-axis direction. When the LED boards 118 and the light guide members 119 are grouped into the first column, the second column, and the third column from the left side in FIGS. 8 and 9, the LED boards 118 and the LEDS 17 mounted thereon in the first column are arranged at an end portion of the backlight unit 12 and covered by the receiving plate 14C from the front side. The LED boards 118 and the LEDs 17 mounted thereon in the second column are covered by an edge portion of the light guide member 119 in the first column from the front side. The LED boards 118 and the LEDs 17 mounted thereon in the third column are covered by an edge portion of the light guide member 119 in the second column from the front side.

As illustrated in FIG. 8, the first connector 30 is integrally provided with one end of the long side of each LED board 118 (an upper end in FIG. 8). The second connector 31 is integrally provided with the other end of the long side of the LED board 118 (a lower end in FIG. 8). The input FPC 25, an output FPC 126, a relay FPC 32 or 33, which will be explained later, is plugged into the first connector 30 or the second connector 31. When plugged, the first connector 30 and the second connector 31 are connected to other LED boards 118 and the LED driver 22. The first connector 30 and the second connector 31 are provided with the first terminal portion 30a and the second terminal portion 31a including terminals of wiring patterns, similar to the first embodiment. In this embodiment, the output connectors 26 of the first embodiment are replaced by the output FPCs 126 including similar terminals and wiring patterns.

The wiring patterns on the LED boards 118 will be explained. As illustrated in FIG. 10, each LED board 118 includes one connection wiring pattern 27 that connects four LEDs 17 in series and five through wiring patterns 28 corresponding to the number of other LED boards 118. The five through wiring patterns 28 are indicated by different symbols for differentiating them from one another. The first through wiring pattern 28A, the second through wiring pattern 28B, the third through wiring pattern 28C, the fourth through wiring pattern 28D, and the fifth through wiring pattern 28E are arranged in this sequence from the upper side in FIG. 10. The first through wiring pattern 28A, the second through wiring pattern 28B, the third through wiring pattern 28C, and the fourth through wiring pattern 28D are parallel to the connection wiring pattern 27. The fifth through wiring pattern 28E crosses the other wiring patterns 27 and 28A to 28D that are parallel to each other and intersections 129 are formed. The first terminals 27a and 28Aa to 28Ea of the first terminal portion 30a of the first connector 30 are arranged such that the first connection terminal 27a, the first terminal 28Aa for the first through wiring pattern 28A, the first terminal 28Ba for the second through wiring pattern 28B, the first terminal 28Ca for the third through wiring pattern 28C, the first terminal 28Da for the fourth through wiring pattern 28D, and the first terminal 28Ea for the fifth through wiring pattern 28E are in this sequence from the upper side in FIG. 10. The second terminals 27B and 28AB to 28Eb of the second terminal portion 31a of the second connector 31 are arranged such that the second terminal 28Eb for the fifth through wiring pattern 28E, the second connection terminal 27b, the second terminal 28Ab for the first through wiring pattern 28A, the second terminal 28Bb for the second through wiring pattern 28B, the second terminal 28Cb for the third through wiring pattern 28C, and the second terminal 28Db of the fourth through wiring pattern 28D are in this sequence from the upper side in FIG. 10.

In this embodiment, three pairs of the LED boards 118, each pair including two LED boards 118 arranged along the Y-axis direction, are arranged separately from each other in the X-axis direction. A sequence of connection of the relay FPCs 32 and 33 used for relay connection of LED boards 118 is defined as follows for the convenience of placement of the relay FPC 32 in the chassis 14. The first LED board 118A on the upper side in FIG. 8 in the first column, the second LED board 118B on the lower side in the first column, the third LED board 118C on the lower side in the second column, the fourth LED board 118D on the upper side in the second column, the fifth LED board 118E on the upper side in the third column, and the sixth LED board 118F on the lower side in the third column are connected in this sequence by the relay FPCs 32 and 33. The first connector 30 and the second connector 31 of the LED boards 118 adjacently arranged in the Y-axis direction (the first LED board 118A and the second LED board 118B, the third LED board 118C and the fourth LED board 118D, the fifth LED board 118E and the sixth LED board 118F) are arranged adjacent to each other. Therefore, the LED boards 118 adjacently arranged in the Y-axis direction are relay-connected by the first relay FPC 32 that relay-connects the first connector 30 and the second connector 31. The LED boards 118 adjacently arranged in the X-axis direction (the second LED board 118B and the third LED board 118C, the fourth LED board 118D and the fifth LED board 118E) are relay-connected by the second relay FPC 33 that relay-connects the first connectors 30 or the second connectors 31.

The first connectors 30 (the first terminal portions 30a) of the first LED board 118A, the second LED board 118B, the fifth LED board 118E, and the sixth LED board 118F are input terminals, and the second connectors 30 thereof (the second terminal portions 31a) are output terminals. The second connectors 31 (the second terminal portions 31a) of the third LED board 118C and the fourth LED board 118D are input terminals, and the first connectors 30 (the first terminals 30a) thereof are the output terminals. The configurations of the wiring patterns and the connectors 30 and 31 of the third LED board 118C and the fourth LED board 118D are the same as those of the other LED boards 118A, 118B, 118E and 118F although the LEDs 17 are arranged on the third LED board 118C and the fourth LED board 118D with polarities thereof opposite to those of the LEDs 17 on the other LED boards 118A, 118B, 118E and 118F. Because the LED boards 118 have common configurations regarding the wiring patterns and the connectors 30 and 21, the manufacturing cost of the LED boards 118 can be reduced.

Each relay FPC 32 or 33 has six relay wiring patterns 34 or 35. First terminals 34Aa to 34Fa or 35Aa to 35Fa are provided at one of ends of the relay FPC 32 or 33 and second terminals 34Ab to 34Fb or 35Ab to 35Fb are provided at the other end. The relay wiring patterns 34 of 35 include the first relay wiring pattern 34A or 35A, the second relay wiring pattern 34B or 35B, the third relay wiring pattern 34C or 35C, the fourth relay wiring pattern 34D or 35D, the fifth relay wiring pattern 34E or 35E, and the sixth relay wiring pattern 34F or 35F in this sequence from the upper side in FIG. 10 corresponding to the first terminals 34Aa to 34Fa or 35Aa to 35Fa. The first terminals 33Aa to 33Fa or 35Aa to 35Fa form a first relay terminal portion 32a or 33a. The second terminals 33Ab to 33Fb or 35Ab to 35Fb form a second relay terminal portion 32b or 33b. The first relay FPC 32 connects the first connector 30 and the second connector 31 having the terminals in different arrangements. The relay wiring patterns 34 are all parallel to each other. The terminals in the first relay terminal portion 30a and the second relay terminal portion 31a of the first relay FPC 32 are arranged according to the first relay wiring pattern 35A to the sixth relay wiring pattern 35F arranged in this sequence from the upper side in FIG. 10.

The second relay FPC 33 connects the first connectors or the second connectors 31 having the same terminal arrangements. The relay wiring patterns 35 crosses each other. Specifically, the first relay wiring pattern 35A to the fourth relay wiring pattern 35D are parallel to each other, and the fifth relay wiring pattern 35E and the sixth relay wiring pattern 35F are parallel to each other. The fifth relay wiring pattern 35E and the sixth relay wiring pattern 35F cross the first relay wiring pattern 35A to the fourth relay wiring pattern 35D. The first relay wiring pattern 35A to the sixth relay wiring pattern 35F (or the first terminal 35Aa to 35Fa) of the second relay FPC 33 are arranged in the first relay terminal portion 33 in this sequence from the upper side in FIG. 10. The second terminal 35Fb of the fifth relay wiring pattern 35E, the second terminal 35Fb of the sixth relay wiring pattern 35F, the second terminal 35Ab of the first relay wiring pattern 35A, the second terminal 35Bb of the second relay wiring pattern 35B, the second terminal 35Cb of the third relay wiring pattern 35C, and the second terminal 35Db of the fourth relay wiring pattern 35D are arranged in the second relay terminal portion 33b in this sequence from the upper side in FIG. 10.

The connection configurations of the LED boards 118 using the relay FPCs 32 and 33 will be explained in more detail. The first relay FPC 32 is plugged into the second connector 31 of the first LED board 118A and the first connector 30 of the second LED board 118B. As a result, the connection wiring pattern 27 and the first through wiring pattern 28A to the fourth through wiring pattern 28D of the first LED board 118A are connected to the first through wiring pattern 28A to the fifth through wiring pattern 28E. Moreover, the fifth through wiring pattern 28E of the first LED board 118A is connected to the connection wiring pattern 27 of the second LED board 118B. The third LED board 118C and the fourth LED board 118D or the fifth LED board 118E and the sixth LED board 118F are connected to each other using the first relay FPC 32, and the connections between the wiring patterns are the same as the connections between the wiring patterns on the first LED board 118A and the second LED board 118B. Therefore, they will not be explained.

The second relay FPC 33 is plugged into the second connector 31 of the second LED board 118B and the first connector 31 of the third LED board 118C. As a result, the fourth through wiring pattern 28D of the second LED board 118B is connected to the connection wiring pattern 27 of the third LED board 118C, the fifth through wiring pattern 28E of the second LED board 118B is connected to the first through wiring pattern 28A of the third LED board 118C, and the connection wiring pattern 27 and the first through wiring pattern 28A to the third through wiring pattern 28C of the second LED board 118B are connected to the second through wiring pattern 28B to the fifth through wiring pattern 28E of the third LED board 118C, respectively. In the connection between the fourth LED board 118D and the fifth LED board 118E using the second relay FPC 33, the first connectors 30 are connected. The connections between the wiring patterns of those LED boards are the same as those between the second LED board 118B and the third LED board 118C and thus will not be explained. The input FPC 25 is plugged into the first connector 30 of the first LED board 118A and the output FPC 126 is plugged into the second connector 31 of the sixth LED board 118F. As a result, the LED boards 118A to 118E are connected to the LED driver 22.

The connection wiring pattern 27 of each of the LED boards 118A to 118F is connected to the LED driver 22 via the through wiring patterns 28 of the other LED boards according to the connection configurations described above. For example, the connection wiring pattern 27 of the first LED board 118A is connected to the LED driver 22 via the first through wiring pattern 28A of the second LED board 118B, the third through wiring pattern 28C of the third LED board 118C, the second through wiring pattern 28B of the fourth LED board 118D, the fourth through wiring pattern 28D of the fifth LED board 118E, and the fifth through wiring pattern 28E of the sixth LED board 118F. Similarly, the connection wiring pattern 27 of each of the second LED board 118B to the sixth LED board 118F is only connected to the through wiring pattern 28 and not connected to the connection wiring pattern 27 of the other LED board 118. With this configuration, series of the LEDs 17, in each of which the LEDs 17 are connected in series by the connection wiring pattern 27, are connected in parallel to the LED driver 22. Therefore, the LEDs 17 in each series are driven in series. For convenience of arrangement of the LED boards 118 inside the chassis 14, the outputs and the inputs of some LED boards 118 are opposite. Although the polarities of the LEDs 17 mounted on the LED boards 118 need to be reversed, the wiring patterns and the configurations of the connectors 30 and 31 are common and thus the LED boards 118 can be produced at low cost. Furthermore, only two kinds of the relay FPCs 32 and 33 are required for relay-connecting the LED boards 18 to each other. Therefore, the manufacturing cost can be further reduced.

As described above, this embodiment includes the first relay FPC 32 and the second relay FPC 33. The first relay FPC 32 is the first relay component for relay-connecting the second terminal portion 31a of the first LED board 118A to the first terminal portion 30a of the second LED board 118B. The second relay FPC 33 is the second relay component for relay-connecting the second terminal portion 31a of the second LED board 118B to the second terminal portion 31a of the third LED board 118C. The first relay FPC 32 has the relay wiring patterns 34 that are parallel relay wiring patterns arranged parallel to each other and connected to the second terminal portion 31a of the first LED board 118A and the first terminal portion 30a of the second LED board 118B. The second relay FPC 33 has the relay wiring patterns 35 that are crossing relay wiring patterns arranged so as to cross each other and connected to the second terminal portion 31a of the second LED board 118B and the second terminal portion 31a of the third LED board 118C.

The second terminal portion 31a of the first LED board 118A is connected to the first terminal portion 30a of the second LED board 118B via the first relay FPC 32. The arrangement of the second connection terminal 27b and the second through terminals 28Ab to 28Eb in the second terminal portion 31a is different from the arrangement of the first connection terminal 27a and the first through terminals 28Aa to 28Ea in the first terminal portion 30a. The first relay FPC 32 includes the relay wiring patterns 34 parallel to each other. Therefore, the second terminal 27b of the connection wiring pattern 27 of the first LED board 118A can be connected to one of the first terminals 28Aa to 28Ea of the through wiring patterns 28. The second through terminals 28Ab to 28Eb of the through wiring patterns 28 of the first LED board 118A can be connected to the first connection terminal 27a of the connection wiring pattern 27 or the first through terminals 28Aa to 28Ea of the through wiring patterns 28 other than one that is connected to the connection wiring pattern 27 of the first LED board 118A.

The second terminal portions 31a of the second LED board 118B and the third LED board 118C are relay-connected to each other via the relay FPC 33. The arrangements of the second connection terminal 27b and the second through terminals 28Ab to 28Eb in the second terminal portions 31a are the same. The relay FPC 33 includes the relay wiring patterns 35 that cross each other. Therefore, the second connection terminal 27b of the connection wiring pattern 27 of the second LED board 118B can be connected to one of the second through terminals 28Ab to 28Eb of the through wiring patterns 28 of the third LED board 118C. One of the second through terminals 28Ab to 28Eb of the through wiring patterns 28 of the second LED board 118B connected to the connection wiring pattern 27 of the first LED board 118A can be connected to one of the second through terminals 28Ab to 28Eb of the through wiring patterns 28 of the third LED board 118C other than one connected to the connection wiring pattern 27 of the second LED board 118B. One of the second through terminals 28Ab to 28Eb of the through wiring patterns 28 of the second LED board 118B other than one connected to the connection wiring pattern 27 of the first LED board 118A can be connected to the second connection terminal 27b of the connection wiring pattern 27 of the third LED board 118C.

The second relay FPC 33 is prepared in addition to the first relay FPC 32 that relay-connects the first terminal portion 30a to the second terminal portion 31a. Therefore, the second terminals 31a can be connected to each other. With this configuration, the flexibility in the arrangement of the LED boards 118 inside the backlight unit 112 increases.

The first LED board 118A and the second LED board 118B are arranged such that the second terminal portion 31a and the first terminal portion 30a of the second LED board 118B are adjacent to each other. The second LED board 118B and the third LED board 118C are arranged in the direction (the X-axis direction) perpendicular to the direction in which the first LED board 118A and the second LED board 118B are arranged (the Y-axis direction). The third LED board 118C is arranged parallel to the second LED board 118B with respect to the direction perpendicular to the direction in which the first LED board 118A and the second LED board 118B are arranged. This configuration is preferable for increasing the size of the backlight unit 112.

Each LED board 118 includes the first connector 30 having the first terminal portion 30a and the second connector 31 having the second terminal portion 31a. The relay FPC 32 or 33 is plugged into the first connector 30 or the second connector 31. With this configuration, the LED boards 118 including the first connectors 30 and the second connectors 31 are prepared as the same parts. Therefore, the manufacturing cost of the LED boards 118 can be further reduced.

Third Embodiment

The third embodiment of the present invention will be explained with reference to FIG. 11. This embodiment may be considered as a modification of the first embodiment. LED boards 218 include different wiring patterns from those in the first embodiment. The LED boards 218 are connected to each other via relay FPCs 36. The intersections 29 of the wiring patterns on each LED board 18 in the first embodiment are not present. Wiring patterns on the relay FPCs 36 have intersections in this embodiment. Similar configurations, operations, and effects to those of the first and the second embodiments will not be explained.

Figure 11:
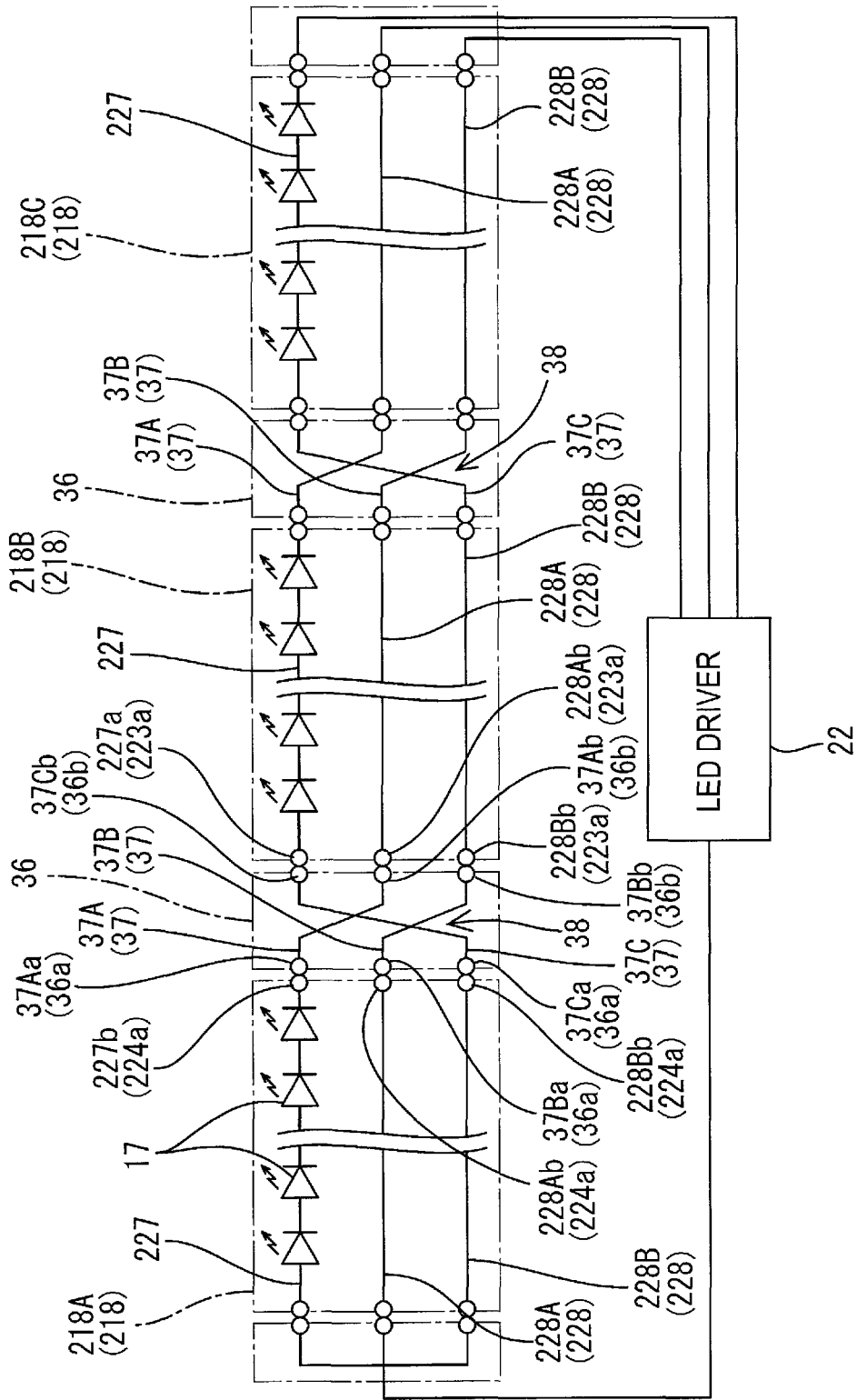
FIG. 11 is a detailed circuit diagram of an LED drive circuit according to a third embodiment of the present invention.

As illustrated in FIG. 11, a connection wiring pattern 227 and through wiring patterns 228 on each of three LED boards 218 are parallel to each other for an entire length of the LED board 218 and do not cross each other. The second terminal portion 224a and the first terminal portion adjacent LED boards 218 (the first LED board 218A and the second LED board 218B, the second LED board 218B and the third LED board 218C) are connected to each other via the relay FPC 36, which will be explained later. At ends of each LED board 218, the first connector (not illustrated) including the first terminal portion 223a and the second connector (not illustrated) including the second terminal portion 224a are provided. Configurations of the connectors are similar to those of the second embodiment and the relay FPC 36 is plugged into them.

Each relay FPC 36 includes three relay wiring patterns 37. The first terminals 37Aa to 37Ca are provided at one end of the relay FPC 36 and the second terminals 37Ab to 37Cb are provided at the other end. The relay wiring patterns 37 include the first relay wiring pattern 37A, the second relay wiring pattern 37B, and the third relay wiring pattern 37C arranged in this sequence from the upper side in FIG. 11 corresponding to the first terminals 37Aa to 37Ca. The first terminals 37Aa to 37Ca form the first relay terminal portion 36a, and the second terminals 37Ab to 37Cb form the second relay terminal portion 36b. The relay wiring patterns 37 of the relay FPC 36 have intersections 38 at which they cross. Because of the intersections 38, the arrangement of the first terminals 37Aa to 37Ca in the first relay terminal portion 36a is different from the arrangement of the second terminals 37Ab to 37Cb in the second relay terminal portion 36b. Specifically, the first relay wiring pattern 37A and the second relay wiring pattern 37B are parallel to each other. The third relay wiring pattern 37C crosses the first relay wiring pattern 37A and the second relay wiring pattern 37B. In the first relay terminal portion 36a, the first terminal 37Aa of the first relay wiring pattern 37A, the first terminal 37Ba of the second relay wiring pattern 37B, and the first terminal 37Ca of the third relay wiring pattern 37C are arranged in this sequence from the upper side in FIG. 11. In the second relay terminal portion 36b, the second terminal 37Cb of the third relay wiring pattern 37C, the second terminal 37Ab of the first relay wiring pattern 37A, and the second terminal 37Bb of the second relay wiring pattern 37B are arranged in this sequence from the upper side in FIG. 11.

The terminals are arranged in the first relay terminal portion 36a and the second relay terminal portion 36b as described above. Therefore, when the relay FPC 36 is plugged into the connectors of the LED board 218, the terminals are connected as follow. The second connection terminal 227b in the second terminal portion 224 of the LED board 218 is connected to the first terminal 37Aa of the first relay wiring pattern 37A. The second terminal 228Ab of the first through wiring pattern 228A is connected to the first terminal 37Ba of the second relay wiring pattern 37B. The second terminal 228Bb of the second through wiring pattern 228B is connected to the first terminal 37Ca of the third relay wiring pattern 37C. The connection first terminal 227a in the first terminal portion 223a of the other LED board 218 is connected to the second terminal 37Cb of the third relay wiring pattern 37C. The first terminal 228Aa of the first through wiring pattern 228A is connected to the second terminal 37Ab of the first relay wiring pattern 37A. The first terminal 228Ba of the second through wiring pattern 228B is connected to the second terminal 37Bb of the second relay wiring pattern 37B. When the first LED board 218A is connected to the second LED board 218B via the relay FPC 36 and the second LED board 218B is connected to the third LED board 218C, the connection wiring pattern 227 of each LED board 218 is electrically connected to the LED driver 22 via the through wiring pattern 228 of the other LED board 218.

Fourth Embodiment

Figure 12:
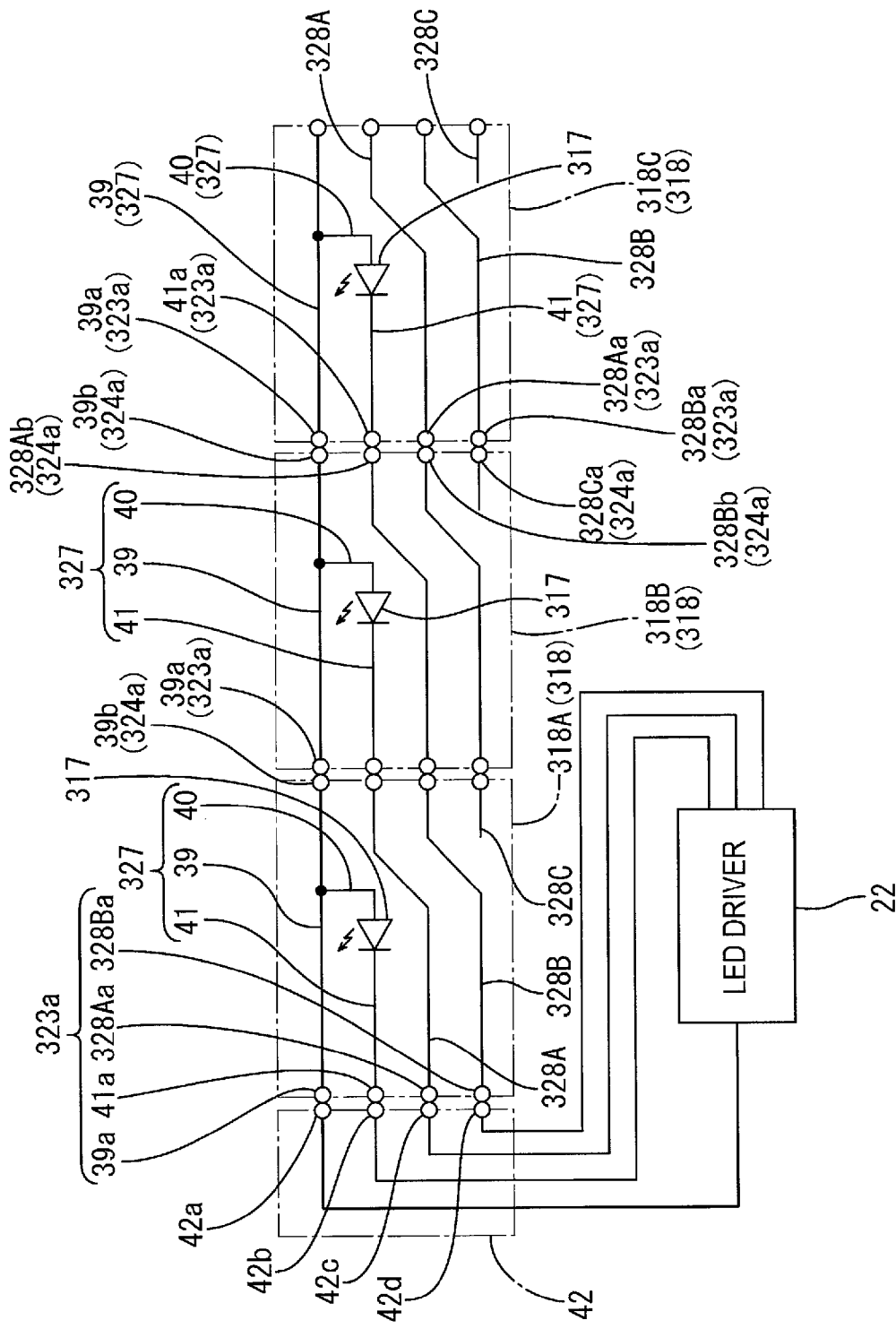
FIG. 12 is a detailed circuit diagram of an LED drive circuit according to a fourth embodiment of the present invention.

The fourth embodiment of the present invention will be explained with reference to FIG. 12. In this embodiment, LED boards 318 having different wiring patterns from those in the first to the third embodiments and no intersections. Similar configurations, operations, and effects similar to the first to the third embodiments will no be explained.

In this embodiment, three LED boards 318 are connected to each other similarly to the first embodiment. One LED 317 is mounted on each LED board 318. Each LED board 318 has a connection wiring pattern 327 and three through wiring patterns 328A to 328C not connected to the LED 317. The connection wiring pattern 327 include a common input wiring pattern 39, a branch input wiring pattern 40, and an output wiring pattern 41. The common input wiring pattern 39 is connected to an input side of the LED driver 22. The branch input wiring pattern 40 is branched off from the common input wiring pattern 39 and connected to the LED 317. The output wiring pattern 41 is pulled out from the LED 317 and connected to an output side of the LED driver 22. Through wiring patterns 328A to 328C are parallel to each other, that is, they neither cross each other nor the connection wiring pattern 327. The LED board 318 includes the first terminal portion 323a in which the first terminal 39a of the common input wiring pattern 39, a terminal 41a of the output wiring pattern 41, the first terminal 328Aa of the first through wiring pattern 328A, and the first terminals 328Ba of the second through wiring pattern 328B arranged adjacently to each other. In the second terminal portion 324a of the LED board 318, the second terminal 39b of the common input wiring pattern 39, the second terminal 328Ab of the first through wiring pattern 328A, the second terminal 328Bb of the second through wiring pattern 328B, and a terminal 328Ca of the third through wiring pattern 328C are arranged adjacently to each other. The LED boards 318A to 318C have the same wiring patterns.

The first terminal portions 323a and the second terminal portions 324a of three LED 318 having the wiring patterns described above are connected to each other. An input and output FPC 42 extending from the LED driver 22 is connected to the first terminal portion 323a of the first LED board 318A. The input and output FPC 42 includes an input terminal 42a, the first output terminal 42b, the second output terminal 42c, and the third output terminal 42d.

Connection configurations of the wiring patterns will be explained in detail. The first terminals 39a of the common input wiring patterns 39 of the LED boards 318 are connected to the second terminals 39b of the respective common input wiring patterns 39. The first terminal 39a of the common input wiring pattern 39 of the first LED board 318A is connected to the input terminal 42a of the input and output FPC 42. The terminal 41a of the output wiring pattern 41 of the first LED board 318A is connected to the first output terminal 42b of the input and output FPC 42. The terminal 41a of the output wiring pattern 41 of the second LED board 318B is connected to the second terminal 328Ab of the first through wiring pattern 328A of the first LED board 318A. The first terminal 328Aa of the first through wiring pattern 328A is connected to the second output terminal 42c of the input and output FPC 42. The terminal 41a of the output wiring pattern 41 of the third LED board 318C is connected to the second terminal 328Ab of the first through wiring pattern 328A of the second LED board 318B. The first terminal 328Aa of the first through wiring pattern 328A is connected to the second terminal 328Bb of the second through wiring pattern 328B of the first LED board 318A. The first terminal 328Ba of the second through wiring pattern 328B is connected to the third output terminal 42d of the input and output FPC 42. With the above configurations, the LED 317 of the second LED board 318B is connected to the LED driver 22 via the firth through wiring pattern 328A of the first LED board 318A, and the LED 317 of the third LED board 318C is connected to the LED driver 22 via the first through wiring pattern 328A of the second LED board 318B and the second through wiring pattern 328B of the first LED board 318A. As a result, the LEDs 317 can be driven and controlled.

Other Embodiments

The embodiments according to the present invention have been described. The present invention is not limited to the embodiments explained in the above description with reference to the drawings. The following embodiments may be included in the technical scope of the present invention, for example.

(1) In the above embodiment, the connection wiring patterns are arranged on the uppermost side and the through wiring patterns are arranged below the respective connection wiring patterns for illustrative purposes. Each connection wiring pattern may be arranged at the center and the through wiring patterns may be arranged above and below the connection wiring pattern. The connection wiring pattern may be arranged on the lowermost side. The arrangements of the terminals may be altered according to the arrangements of the wiring patterns.

(2) In the first and the second embodiments, each LED board has the wiring patterns, the lowermost through wiring pattern of which crosses the connection wiring pattern and the other through wiring patterns parallel to each other. However, the wiring pattern that crosses the other wiring patterns can be altered as long as the arrangement of the terminals in the first terminal portion is different from the arrangement of the terminals in the second terminal portion. For instance, the connection wiring pattern may be arranged so as to cross the through wiring patterns parallel to each other. The wiring patterns of the relay FPCs in the third embodiment can be altered as in the same manner as above.

(3) The number of the LED boards may be altered from the above embodiment as necessary. The number of the through wiring patterns on each LED board may be the total number of the LED board minus one. If the total number of the connection wiring pattern and the through wiring patterns is four or larger, the wiring patterns may be divided into a plurality of groups, in each of which the wiring patterns may be arranged parallel to each other, and the groups of the wiring patterns may cross each other to form intersections. With the intersections, the arrangement of the terminals in the first terminal portion is totally different from the arrangement of the terminals in the second terminal portion. Such wiring patterns are applicable for the second and the third embodiments.

(4) In the first and the second embodiments, the intersection is provided between the LED the closest to the connector joint (or the second connector) and the second terminal portion. However, the intersection may be arranged between the LED the closest to the connector (or the first connector) and the first terminal portion.

(5) In the first to the third embodiments, the wiring patterns extending from the respective terminals of the input FPC are collectively connected to the LED driver. Furthermore, the wiring patterns extending from the respective terminals of the output connector (or the output FPC) are separately connected to the LED driver. However, the wiring patterns extending from the respective terminal of the output connector (or the output FPC) may be collectively connected to the LED driver, and the wiring patterns extending from the respective terminals of the input FPC may be separately connected to the LED driver. The wiring patterns extending from the respective terminals of the input FPC and the output connector (or the output FPC) may be all separately connected tot the LED driver.

(6) In the first to the third embodiments, each input FPC includes a plurality of the terminals corresponding to the terminals of the connector (the first connector). However, the terminals of the input FPC may be provided as a single terminal because the terminals of the input FPC are at the same potential. When the configuration of (5) is applied, this configuration may be applied to the output connectors (or the output FPCs).

(7) The connection configurations of the adjacent LED boards can be altered from those in the above embodiment as necessary. For instance, male connector may be provided at one of ends of each LED board and female connector that can receive the male connectors may be provide at the other end. The adjacent LED boards are arranged such that the male connectors and the female connectors are adjacently arranged. By fitting the male connectors into the female connectors, the LED boards are electrically connected.

(8) In the above embodiments, each LED board includes the substrate with relatively low flexibility and the LED(s) mounted thereon. However, the LED board may include a film substrate (or a sheet substrate) with relatively high flexibility and the LED(s) mounted thereon.

(9) The arrangement of the LED boards in the backlight unit may be altered from those in the above embodiments as necessary. For instance, the LED boards may be arranged at ends of the long side of the backlight unit such that the LEDs at one end face the LEDs at the other end. The light guide members may be arranged such that they are sandwiched between the LED boards. The LED boards may be arranged at one of the short-side ends of the backlight unit or at both of the short-side ends. The LED boards may be arranged at ends of the long side and the long side of the backlight unit, and the light guide members may be arranged according to the arrangement of the LED boards.

(10) In the above embodiments, the number of the LED boars and the number of the light guide members are equal. However, the number of the light guide members may be different from the number of the LED boards. For instance, only one light guide member may be provided for a plurality of the LED boards.

(11) In the above embodiments, the edge-light backlight unit including the LEDs and the LED boards arranged at the ends of the light guide members is used. However, the technology described herein may be applied to a direct backlight unit including LEDs and LED boards arranged directly behind light guide members. In such a direct backlight unit, the light guide members may not be used.

(12) The liquid crystal panel and the chassis are set in the vertical position with the short-side directions thereof aligned with the vertical direction. However, the liquid crystal panel and the chassis may be set in the vertical position with a long-side direction thereof aligned with the vertical direction.

(13) In the above embodiments, the TFTs are used as switching components of the liquid crystal display device. However, the technology described herein can be applied to liquid crystal display devices using switching components other than TFTs (e.g., thin film diodes (TFDs)). Furthermore, it can be applied to black-and-white liquid crystal display devices other than the color liquid crystal display device.

(14) In the above embodiments, the liquid crystal display device including the liquid crystal panel as a display panel is used. However, the present invention can be applied to display devices including other types of display panels.

(15) In the above embodiments, the television receiver including the tuner is used. However, the technology can be applied to a display device without the tuner.

(16) In the above embodiments, each LED includes the single light emitting LED chip configured to emit blue light and is configured to white light using fluorescent substances. However, LEDs each including a single light emitting LED chip configured to emit ultraviolet light and is configured to white light using fluorescent substances may be used.

(17) In the above embodiments, each LED includes the single light emitting LED chip configured to emit blue light and is configured to white light using fluorescent substances. However, LEDs each including three kinds of single light emitting LED chips may be used. The single light emitting diodes emit R, G, and B colors of light, respectively. Alternatively, LEDs each including three other kinds of single light emitting LED chips may be used. The single light emitting diodes emit cyan (C), magenta (M), and yellow (Y) colors of light, respectively.

(18) In the above embodiments, the LEDs configured to emit white light are used. However, LEDs configured to emit red light, LEDs configured to emit blue light, and LEDs configured to emit green light may be used in proper combinations.

EXPLANATION OF SYMBOLS

10: Liquid crystal display device (Display device), 11: Liquid crystal panel (Display panel), 12, 112: Backlight unit (Lighting device), 17, 317: LED (Light source), 18, 118, 218, 318: LED board, 18A 118A, 218A, 318A: First LED board, 18B 118B, 218B, 318B: Second LED board, 18C 118C, 218c, 318C: Third LED board, 19, 119: Light guide member, 18a, 119a: Light entrance surface, 19b: Light exit surface, 22: LED driver (Light source driver), 23: Connector, 23a, 223a, 323a: First terminal portion, 24: Connector joint, 24a, 224a, 324a: Second terminal portion, 27, 227, 327: Connection wiring pattern, 27a, 227a: First connection terminal, 27b, 227b: Second connection terminal, 28, 228, 328: Through wiring pattern, 28Aa, 28Ba, 228Aa, 227Ba: First through terminal, 28Ab, 28Bb, 228Ab, 228Bb: Second through terminal, 29, 129, 38: Intersection, 30: First connector, 30a: First connector portion, 31: Second connector, 31a: Second connector portion, 32: First relay FPC (First relay component), 33: Second relay FPC (Second relay component), 34: Relay wiring pattern (Parallel relay wiring pattern), 35: Relay wiring pattern (Crossing relay wiring pattern), TV: Television receiver

The invention claimed is:

1. A lighting device comprising a plurality of light source boards including light sources mounted thereon, each light source board including a connection wiring pattern and a through wiring pattern, the connection wiring pattern being electrically connected to the light source and the through wiring pattern of the other light source board, the through wiring pattern not being electrically connected to the light source, wherein each light source board includes a first terminal portion at one end and a second terminal portion at another end, the first terminal portion including a first connection terminal and a first through terminal arranged adjacent to each other, the first terminal portion being provided at an end of the connection wiring pattern, the first through terminal being provided at an end of the through wiring pattern, the second terminal portion including a second connection terminal and a second through terminal arranged adjacent to each other, the second connection terminal being provided at another end of the connection wiring pattern, the second through terminal being provided at another end of the through wiring pattern, and the connection wiring pattern and the through wiring pattern include an intersection such that an arrangement of the first connection terminal and the first through terminal in the first terminal portion is different from an arrangement of the second connection terminal and the second through terminal in the second terminal portion.

2. The lighting device according to claim 1, further comprising a light source driver electrically connected to the light source boards.

3. The lighting device according to claim 1, wherein
the light source boards include at least a first light source board, a second light source board, and a third light source board, each including at least two through wiring patterns,
the connection wiring pattern of the first light source board is connected to any one of the through wiring patterns of the second light source board and any one of the through wiring patterns of the third light source board, and
the at least two through wiring patterns of the first light source board is connected to the connection wiring pattern of the second light source board and the through wiring patterns of the second light source board other than the through wiring pattern connected to the connection wiring pattern of the first light source board, respectively, and to the connection wiring pattern of the third light source board and the through wiring patterns of the third light source board other than the through wiring pattern connected to the connection wiring pattern of the first light source board, respectively.

4. The lighting device according to claim 3, further comprising a first relay component and a second relay component, the first relay component relay-connecting the second terminal portion of the first light source board to the first terminal portion of the second light source board, the second relay component relay-connecting the second terminal portion of the second light source board to the second terminal portion of the third light source board, the first relay component including a plurality of parallel relay wiring patterns parallel to each other and connected to the second terminal portion of the first light source board and the first terminal portion of the second light source board, the second relay component including a plurality of crossing relay wiring patterns crossing each other and connected to the second terminal portion of the second light source board and the second terminal portion of the third light source board.

5. The lighting device according to claim 4, wherein
the first light source board and the second light source board are arranged such that the second terminal portion of the first light source board and the first terminal portion of the second light source board are adjacent to each other, and
the second light source board and the third light source board are arranged in a direction crossing an arrangement direction in which the first light source board and the second light source board are arranged.

6. The lighting device according to claim 4, wherein
the light source boards include first connectors having the first terminal portions and second connectors having the second terminal portions, and
the first relay component and the second relay component are plugged into the first connectors and the second connectors.

7. The lighting device according to claim 1, wherein each light source board includes a connector having the first terminal portion and a connector joint having the second terminal portion and plugged into the connector of the other light source board.

8. The lighting device according to claim 1, further comprising at least one light guide member arranged opposite light emitting surfaces of the light sources.

9. The lighting device according to claim 8, wherein the at least one light guide member includes a plurality of light guide members corresponding to the light source boards, the light guide members being arranged parallel to each other.

10. The lighting device according to claim 8, wherein the at least one light guide member has a light entrance surface and a light exit surface, the light entrance surface being opposite the light emitting surfaces and through which light enters, the light exit surface through which the light exits and extending in a direction crossing the light entrance surface and parallel to an arrangement direction in which the light sources and the light entrance surface are arranged.

11. The lighting device according to claim 1, wherein the light sources are LEDs.

12. A display device comprising:
the lighting device according to claim 1; and
a display panel configured to provide display using light from the lighting device.

13. The display device according to claim 12, wherein the display panel is a liquid crystal display including a pair of substrates with liquid crystals sealed therebetween.

14. A television receiver comprising the display device according to claim 12.

* * * * *